(12) United States Patent
Pemberton et al.

(10) Patent No.: US 12,494,194 B1
(45) Date of Patent: Dec. 9, 2025

(54) MACHINE LEARNING MODEL ARCHITECTURE FOR INCREMENTAL ASYNCHRONOUS INFERENCE

(71) Applicant: Amazon Technologies, Inc., Seattle, WA (US)

(72) Inventors: Joe Pemberton, Seattle, WA (US); Vijitha Raji, Sammamish, WA (US); Jae Young Do, Kirkland, WA (US); Sahil Malik, Seattle, WA (US); Mohammad Kachuee, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 279 days.

(21) Appl. No.: 18/142,972

(22) Filed: May 3, 2023

(51) Int. Cl.
G10L 15/22 (2006.01)
G10L 15/02 (2006.01)
G10L 15/16 (2006.01)
G10L 15/18 (2013.01)

(52) U.S. Cl.
CPC .............. *G10L 15/16* (2013.01); *G10L 15/02* (2013.01); *G10L 15/1815* (2013.01); *G10L 15/22* (2013.01); *G10L 2015/223* (2013.01)

(58) Field of Classification Search
CPC ..... G10L 15/16; G10L 15/02; G10L 15/1815; G10L 15/22; G10L 2015/223; G06N 20/00
USPC .......................................................... 704/232
See application file for complete search history.

(56) References Cited

U.S. PATENT DOCUMENTS

| | | | |
|---|---|---|---|
| 10,372,824 B2 * | 8/2019 | Bull | G06F 40/30 |
| 11,195,522 B1 * | 12/2021 | Makashir | G10L 15/1815 |
| 11,568,863 B1 * | 1/2023 | Sarikaya | G10L 15/02 |
| 11,615,785 B2 * | 3/2023 | Zhou | G10L 15/1822 |
| | | | 704/257 |
| 12,112,752 B1 * | 10/2024 | Gupta | G10L 15/08 |
| 2020/0234713 A1 * | 7/2020 | Gowda | G10L 15/28 |
| 2021/0183392 A1 * | 6/2021 | Lee | G06N 3/045 |
| 2021/0366466 A1 * | 11/2021 | de La Jonquière | G06N 3/08 |
| 2021/0398533 A1 * | 12/2021 | Gao | G10L 15/08 |

* cited by examiner

*Primary Examiner* — Vijay B Chawan
(74) *Attorney, Agent, or Firm* — K&L Gates LLP

(57) ABSTRACT

Devices and techniques are generally described for incremental, asynchronous machine learning inference. In various examples, first feature data generated from a first process during a first time period may be input into a first subgraph of a neural network. Second feature data generated from the first process during a second time period may be input into a second subgraph of the neural network. First intermediate data may be generated by the first subgraph based on the first feature data. Second intermediate data may be generated by the second subgraph based on the second feature data. First output data may be generated by the neural network based on the first intermediate data and the second intermediate data.

20 Claims, 9 Drawing Sheets

MACHINE LEARNING MODEL ARCHITECTURE FOR INCREMENTAL ASYNCHRONOUS INFERENCE

BACKGROUND

Machine learning techniques are used to form predictions, solve problems, recognize objects in image data for classification, etc. For example, machine learning techniques may be used to detect objects represented in image data and/or translate text from one human understandable language to another. In various examples, machine learning models may be improved over time by retraining the models as more or different data becomes available. Accordingly, machine learning techniques are adaptive to changing conditions. Deep learning algorithms, such as neural networks, are sometimes used to detect patterns in data and/or perform tasks.

DETAILED DESCRIPTION

Figure 1:
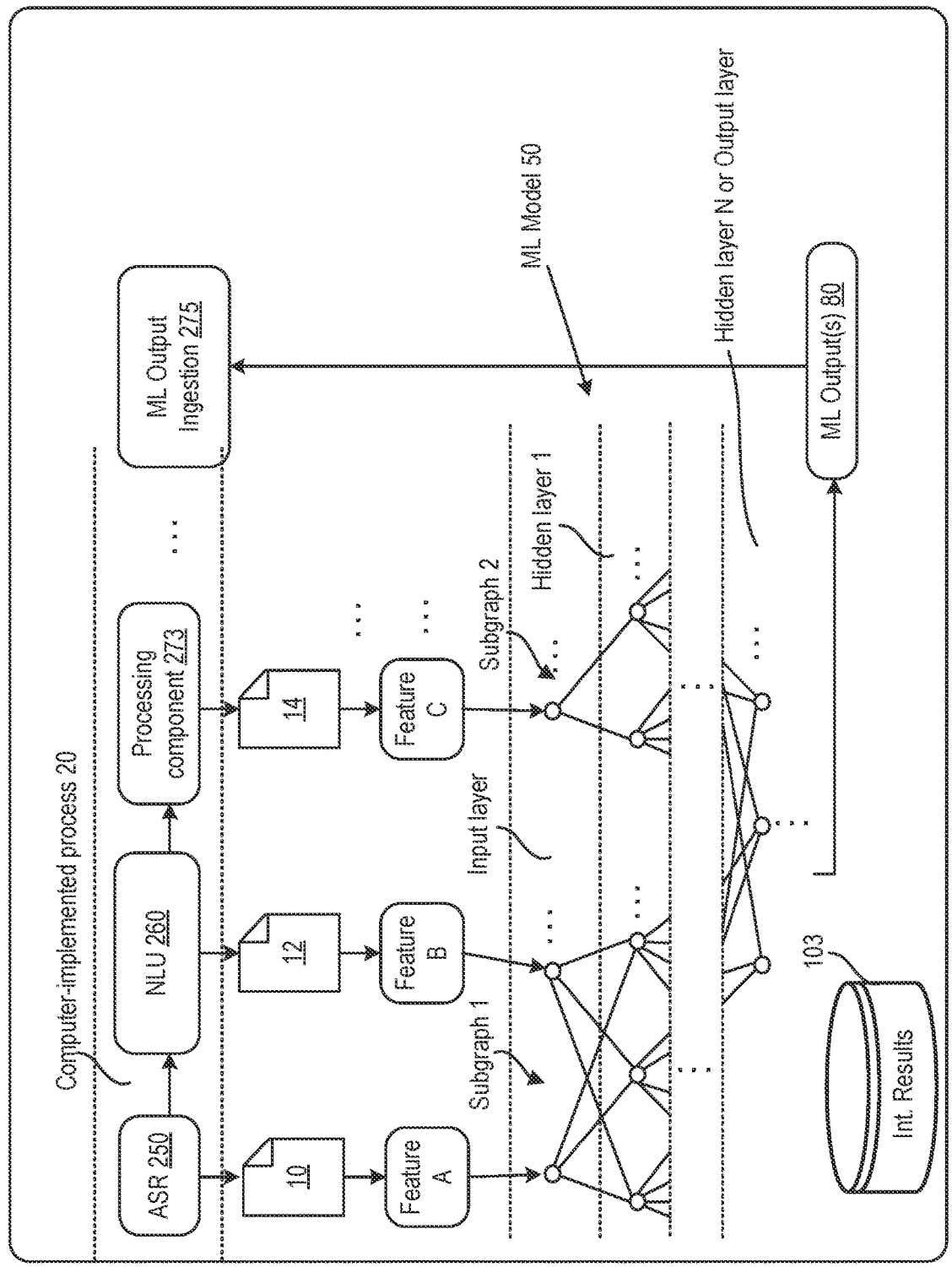
FIG. 1 is a block diagram illustrating an example of incremental asynchronous inference processing by a machine learning model, according to various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Machine learning techniques, such as those described herein, can be used to form predictions, solve problems, recognize objects in image data for classification, etc. In various examples, machine learned models may perform better than or in combination with rule-based systems. In some embodiments, machine learning techniques may be more adaptable as they may be improved over time by retraining the models as more data becomes available. Accordingly, machine learning techniques are often adaptive to changing conditions. Deep learning algorithms, such as neural networks, are often used to detect patterns in data and/or perform tasks.

In some machine learned models, such as neural networks, parameters can control activations in nodes (e.g., logical units of the machine learning architecture that store respective activation values) within layers of the machine learned models. The weighted sum of activations of each node in a preceding layer may be input to a non-linear activation function (e.g., a sigmoid function, a rectified linear units (ReLu) function, etc.). The result determines the activation of a node in a subsequent layer. In addition, a bias value can be used to shift the output of the activation function positively or negatively and thus may bias a node toward activation (if shifted in the positive direction) or inactivation (if shifted in the negative direction).

Generally, in machine learning models, such as neural networks, after initialization, annotated training data may be used to generate a "loss" function that describes the difference between expected output of the machine learning model (e.g., labeled ground truth data) and actual output. The parameters (e.g., weights and/or biases) of the machine learning model may be updated to optimize the loss function. For example, the parameters of the machine learning model may be updated to minimize (or maximize or otherwise optimize) the loss. For example, the machine learning model may use a gradient descent (or ascent) algorithm to incrementally adjust the weights to cause the most rapid decrease (or increase) to the output of the loss function. The method of updating the parameters of the machine learning model can be referred to as back propagation.

Neural network machine-learning inference techniques typically assume that input features used as input to the model are available prior to inference processing. In neural networks, a forward pass is the process of computing the output of the neural network given an input. As described above, neural networks typically wait for all input features to be present prior to executing a forward pass of the network. A forward pass may also be referred to as "inference" for a model that has been previously trained. During the forward pass, the input is fed into the network, and the network's weights and biases are used to calculate the result for the subsequent layer of the network. The result is then used to calculate the result for the next layer of the network, and so on, until the final output is generated.

For example, during a forward pass, an activation value of a node in a subsequent layer can be determined using a weighted combination of all the activation values of the nodes in the preceding layer to which that node is connected. The weighted sum of activations of each node may be input into a non-linear activation function and adjusted using a bias value (as above described). These operations are performed to calculate the node values for each layer of the neural network until the final output is generated in the last layer of the neural network.

Offered are, among other things, improvements to approaches that optimize inference processing for machine learning focused on heavily optimizing the matrix multiplication operations performed as part of the forward pass through the machine learning network. Embodiments of the invention can be helpful where there are several different processing tasks, and the data used to generate a model's input features become available over a relatively long duration of time.

Take, for example, a natural language processing system that is configured to accept spoken or written natural language requests, interpret the requests, and take some desired action. The natural language processing system may comprise a variety of different systems that may perform different operations related to the natural language processing task. Examples of a natural language processing system flow are described below in reference to FIG. 2. In such a system, data that is used to generate features for a model (e.g., a machine learning model used to rank different natural language processing applications for processing a user-input utterance), may become available at different times during the processing of the input. Aspects of the present invention can improve on systems where a trained model may wait until all of its input features are available before performing inference processing.

For example, features derived from device state information (e.g., the device that received the input utterance) might be available close to the point in time when a voice request is made, user-related information persisted in a data store might resolve a few hundred milliseconds later, and the fully-transcribed utterance text may resolve only once the user has finished speaking their query. Various techniques and/or systems described herein can improve on systems in which inference can only begin once the latest-arriving input feature is available, even if other features are available much earlier. Accordingly, the various systems and techniques described herein may improve latency in the natural language processing system's critical path which, in turn, can lead to reduced latency between the user speaking the request and the natural language processing system providing the desired response.

In various examples discussed herein, machine learning model architectures are described that are able to perform asynchronous, incremental inference. The networks of such models (e.g., the directed acyclic graphs logically representing the architecture of the models) may be selected according to the runtime timing characteristics of the model's input features such that there exist(s) subgraph(s) descending from subsets of early-arriving features. At inference time, each such subgraph may be evaluated when its particular set of input features have resolved (e.g., when the feature data is available for input into the model). When the forward pass of the machine learning model reaches a layer of the network that depends on features which have not yet resolved, a vector representing the intermediate state of the forward pass (e.g., a hidden state vector) may be persisted (externally, or locally in memory) and the forward pass may be temporarily suspended. Once the relevant input features have resolved, the intermediate state vector may be loaded from memory and the forward pass may be resumed. In this way, the inference processing may be spread out in time (e.g., starting earlier in time and potentially finishing sooner and/or using more sophisticated architectures without experiencing increased latency). In addition, the inference processing may be parallelized with other operations in the system, thereby removing portions of inference cost from the broader system's critical path and reducing overall latency. Advantageously, during training, the training data may include all input features per training instance. Accordingly, the various techniques described herein may be used in accordance without changing the desired training-time processes or infrastructure.

As an example of a computer-implemented process that may generate different intermediate outputs (that may, in turn, be used to generate model input features (or which may be directly used as model input features, depending on the particular example)) a natural language processing system and various operations thereof are described herein. However, it should be noted that the machine learning model architectures and techniques used for incremental, asynchronous inference may be used with any underlying computer-implemented process. In general, any computer process that generates a variety of data, over time, may benefit from the machine learning model architectures described herein that provide incremental, asynchronous inference.

Devices with integrated processing capabilities are often configured with network communication capability and/or other computing functions allowing the devices to send data to and/or receive data from other devices. In some examples, such devices may include voice-enabled personal assistants and/or other natural language processing interfaces that may be used to control the devices, answer questions, communicate with other people/devices, and/or otherwise interact with the devices and/or other devices. As such devices become more and more prevalent in both the home, office, public spaces, quasi-public spaces (e.g., hotels, offices, retail spaces), and elsewhere generally, and as the technology matures, new services and features are being developed. For instance, in some cases devices may be paired or otherwise grouped together with one another to enable certain functionality. For example, a device that includes voice-based personal assistant functionality may be paired with a device including a display so that spoken commands may be used to control content output by the display device. In another example, content may be transferred from one device to another device in response to user requests and/or other triggering events (e.g., If This Then That (IFTTT) recipes, presence information, etc.).

Natural language processing applications (e.g., skills configured to work with a natural understanding user interface) may be selected to process a given natural language request. For example, a music skill may be used in response to a request to playback particular songs, albums, artists, musical genres, etc. Each skill may be associated with its own functionality. Some skills may playback content such as the aforementioned music skill and/or a video skill. Other skills may provide answers to user questions, may be used to control devices (e.g., self-driving robots, thermostats, security systems, cameras, etc.), may be used to make purchases (e.g., ordering food, taxis, goods/services from online store, etc.), and/or perform a myriad of other actions. A large number of skills may be implemented to respond to and/or otherwise process user inputs. For example, many natural language processing systems may offer application program interfaces (APIs) whereby other pieces of software, such as skills can be routed data and commands from the natural language processing system. As the number of available skills continues to grow, selection of a particular skill for a given natural language input by a natural language processing system is increasingly a non-trivial task. In various examples, the asynchronous, incremental machine learning inference architectures described herein may be used to generate dense utterance embeddings that may be during ranking of skills for processing a particular natural language request.

In some other examples, asynchronous, incremental machine learning inference architectures described herein may be used to determine a subset of candidate skills for processing a given natural language input from among all available skills. The subset of candidate skills (and/or data representing how appropriate these candidate skills are for processing the current input) may be used by other, downstream routing systems of the natural language processing system to select a skill for processing the natural language component (such as the ranking component described above).

Automatic speech recognition (ASR) is a field of computer science, artificial intelligence, and linguistics concerned with transforming audio data associated with speech into text data and/or other ASR output data representative of that speech. Natural language understanding (NLU) is a field of computer science, artificial intelligence, and linguistics concerned with enabling computers to derive meaning from text input containing natural language, resulting in specific executable command data or other type of instructions. As described in further detail below, in some examples, NLU processing may include multiple different processes that may be executed for a given natural language input in order to determine a semantic interpretation of the natural language input. Natural language generation (NLG) is a computer-based process that may be used to produce natural language output. Text-to-speech (TTS) is a field of computer science, artificial intelligence, and linguistics concerned with enabling computers to output synthesized speech. ASR, NLU, NLG, and TTS may be used together as part of a natural language interface system. As used in, natural language input data may comprise audio data (e.g., representing a user request or command), text data, and/or other representation data representing natural language for input into a natural language processing system.

As used herein, user utterances, input text data, and/or any form of data input to a natural language processing system ("input data") may be described by "request data" and/or "user request data." Such request data may change forms many times during processing of the request data by various components of the natural language processing system. For example, initially the request data may be audio data and/or input text data representing a user question. The audio data may be transformed into text data and/or other ASR output data by an ASR component of the speech processing system. The text data and/or other ASR output data may be transformed into intent data (or other NLU output data representing one or more semantic interpretations of the natural language input) by an NLU component of the speech processing system. The intent data or other NLU output data may be used by a speech processing application (e.g., a skill) to perform an action (e.g., to generate action data (e.g., computer-executable commands) that may be processed in order to take some corresponding action such as answering a user's question, playing video, playing audio, etc.). "Request data" and/or "user request data" may refer to any data related to an input request to a speech processing system (e.g., including the various data forms described above, as each of the aforementioned data types relate to an input request to the speech processing system). In general, as used herein, natural language processing "applications" may be any software (and/or combination of software and hardware) used during natural language processing to take an action in response to input request data (e.g., natural language inputs such as user utterances and/or text). Such applications may include speech processing skills and/or other types of speech processing software.

The various techniques described herein may be used in a variety of contexts, including in natural language processing enabled devices (e.g., devices employing voice control and/or speech processing "voice assistants") and/or systems.

Examples of speech processing systems and/or voice-enabled personal assistants include the Siri system from Apple Inc. of Cupertino, California, voice-enabled actions invoked by the Google Assistant system from Google LLC of Mountain View, California, Dragon speech recognition software or the Cortana system from Microsoft of Redmond, Washington, the Alexa system from Amazon.com, Inc. of Seattle, Washington, etc. Other examples of smart home devices and/or systems that may use the various content-based voice targeting techniques described herein may include Google Nest Smarthome products from Google LLC, HomeKit devices from Apple Inc., various smart doorbells (e.g., with integrated cameras and/or natural language processing capability), etc. For example, some models of Ring camera-integrated doorbells include Alexa speech processing functionality to allow users to have a virtual assistant interact with people at the door to take messages, etc.

Natural language processing enabled devices may include one or more microphones (e.g., far-field microphone arrays) used to transform audio into electrical signals. Speech processing may then be performed, either locally by the speech processing enabled device, by one or more other computing devices communicating with the speech processing enabled device over a network, or by some combination of the natural language processing enabled device and the one or more other computing devices. In various examples, natural language processing enabled devices may include and/or may be configured in communication with speakers and/or displays effective to output information obtained in response to a user's spoken request or command, and/or to output content that may be of interest to one or more users.

Storage and/or use of data related to a particular person or device (e.g., device identifier data, device names, names of device groups, contextual data, and/or any personal data) may be controlled by a user using privacy controls associated with a speech processing enabled device and/or a companion application associated with a speech processing enabled device. Users may opt out of storage of personal, device state (e.g., a paused playback state, etc.), and/or contextual data and/or may select particular types of personal, device state, and/or contextual data that may be stored while preventing aggregation and storage of other types of personal, device state, and/or contextual data. Additionally, aggregation, storage, and use of personal, device state, and/or contextual information, as described herein, may be compliant with privacy controls, even if not legally subject to them. For example, personal, contextual, device state, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the device and/or device group names and/or any data captured by such devices may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

In various examples, a natural language processing enabled device may include a wakeword detection component. The wakeword detection component may process audio data captured by microphones of the speech processing enabled device and may determine whether or not a keyword and/or phrase, which are collectively sometimes referred to herein as a "wakeword", is detected in the audio data. In some examples, when a wakeword is detected, the speech processing enabled device may enter a "sending mode," "audio capturing mode," and/or other type of processing mode in which audio detected by the microphones following the wakeword (e.g., data representing user request data spoken after the wakeword) may be sent to natural language processing computing component(s) (either locally or remotely) for further natural language processing (e.g., ASR, NLU, etc.). In various examples, the wakeword detection component may be used to distinguish between audio that is intended for the natural language processing system and audio that is not intended for the natural language processing system.

In various examples, skills may determine an action to take for processing particular request data according to an interpretation of the natural language input (represented by the request data), as determined by NLU. For example, a particular skill may be selected to process request data based on a determination that the request data refers to the particular skill by name. In another example, a skill may evaluate its ability to process request data based on one or more intents and/or named entities determined during NLU processing of the request data. In another example, a natural language processing system may determine a skill that may generate a response to request data that may be output via a TTS component of the speech processing system.

The natural language processing routing architecture may facilitate the routing of request data to the appropriate skills and/or other speech processing components. In various examples, the natural language processing routing architecture may use machine learning models trained using features computed using user feedback data, contextual data, can fulfill intent request (CFIR) tags, and/or other signals in order to determine the appropriate natural language processing application and/or other speech processing component to process request data. In various examples, using machine learning models to dynamically learn routing may improve the accuracy of the routing of natural language processing requests, resulting in improved user experiences and/or more pertinent responses to request data. For example, a machine learning system may dynamically learn from contextual data and/or user feedback data to provide routing exceptions and/or routing flexibility, in contrast to a deterministic routing system.

FIG. 1 is a block diagram illustrating an example of incremental asynchronous inference processing by a machine learning model, according to various aspects of the present disclosure. The example depicts natural language processing as an example of a computer-implemented process 20 that is occurring over time. It should be noted that this is merely one possible example of a computer-implemented process 20 that may generate feature data used during inference of a machine learning model (e.g., machine learning model 50). Additionally, the natural language processing system shown in FIG. 1 is simplistic and is meant for illustrative purposes only. In the example, an input spoken request may be processed by an ASR component 250 to generate a transcription of the spoken request (e.g., text data), token data representing the transcription, and/or another ASR output representation. During the processing by ASR component 250 data 10 may be generated. Data 10 may be for example, the output text, tokenized data, ASR model confidence scores, etc. In some further examples, data 10 may represent other information, such as context data such as a device ID of a device receiving the spoken request, a device group (indicating a group of devices to which the input device belongs), context data (e.g., the current time, the weather, the location related to the input device, a playback state of the input device), etc. The specific data 10 depends on the process and/or on the machine learning model and/or predictive task being employed and may vary according to the desired implementation.

The data 10 may be processed (e.g., according to computer executable instructions implementing feature-computation logic) to generate Feature A. Although in the simplistic example shown in FIG. 1, only a single feature—Feature A—is shown as being computed from data 10, any number of features may be generated from data generated prior to or during ASR processing by ASR component 250. In the example, Feature A is an input to a node in the input layer of subgraph 1 of machine learning model 50 (e.g., a neural network). A subgraph of a machine learning model, as used herein, refers to nodes/layers of a DAG of a machine learning model (e.g., an input layer and/or one or more hidden layers) that has no dependencies from the input features of any other subgraphs or nodes in preceding layers of the machine learning model. For example, in the example of FIG. 1, the nodes in the hidden layer 1 of the machine learning model 50 in subgraph 1 do not depend on any of the features from subgraph 2 (e.g., Feature C), as these nodes are not connected to any of the nodes in the input layer of subgraph 2. Similarly, the nodes in hidden layer 1 of subgraph 2 do not depend on any of the features from the input layer of subgraph 1 (e.g., Features A and B). Subgraphs are further described below in reference to FIGS. 3A, 3B.

In the example machine learning model 50 of FIG. 1, subgraph 1 includes a node that takes Feature A as input and a node that takes Feature B as input. Immediately following the ASR processing by ASR component 250, Feature A may be available (resolved); however, Feature B may be as of yet unresolved. Accordingly, inference processing by subgraph 1 of machine learning model 50 may not yet commence.

NLU component 260 may receive the ASR output data generated by ASR component 250. NLU component 260 may determine one or more intents corresponding to the user request (e.g., using a probabilistic machine learning model). During NLU processing by NLU component 260 data 12 may be generated which may directly be used as Feature B or which may be processed using feature computation logic to generate Feature B. As with Feature A, there may be many features generated at this stage (each potentially with a corresponding node in the input layer of subgraph 1); however, for ease of illustration, only a single feature—Feature B—is shown. Feature B may be, for example, a numeric encoding of NLU output data determined by NLU component 260 for the current natural language request or some other type of data generated as part of, or contemporaneously with, NLU processing.

Upon generation of Feature B, the subgraph 1 of machine learning model 50 may have all the features used in its input layer (Feature A and Feature B in the depicted example) and accordingly may commence inference processing in accordance with the techniques described herein. As shown, Feature C—which is used in the input layer of subgraph 2—does not resolve until data 14 is generated by processing component 273 (e.g., some NLP component that is downstream of NLU component 260). However, since none of the nodes in subgraph 1 depend on Feature C (e.g., none of the nodes in hidden layer 1 of subgraph 1 are connected to nodes in the input layer of subgraph 2), processing by subgraph 1 may commence before Feature C is resolved. Accordingly, the activation values for the hidden layer 1 of subgraph 1 may be computed during inference processing.

In various examples, eventually subgraph 1 and subgraph 2 may be joined at some deeper layer of machine learning model 50, with the outputs of nodes in subgraphs 1 and 2 serving as inputs to a node in another layer. For example, Hidden Layer N in FIG. 1 has dependencies from both subgraphs 1 and 2 since the nodes in Hidden Layer N are connected to nodes descending from subgraphs 1 and 2. Since subgraph 1 has commenced inference processing prior to subgraph 2 in the current example, subgraph 1 may, in some cases, generate an intermediate result (e.g., intermediate result data, such as a vector with a respective node value for each dimension of the vector) before subgraph 2 has either commenced processing or before subgraph 2 has finished processing. The intermediate result may be generated when the forward pass of subgraph 1 reaches a layer of the machine learning model 50 that depends on features which have not yet resolved, such as Hidden Layer N (which may also be an output layer of the machine learning model 50, depending on the specific implementation), a layer that depends not only on Features A and B, but also on Feature C.

At this point a vector representing the intermediate state of the forward pass may be persisted (externally, or locally in memory such as in intermediate results store 103) and the forward pass may be suspended until the intermediate state from subgraph 2 is also available (e.g., after Feature C is available during processing by processing component 273). When the intermediate state from subgraph 2 is available, the stored intermediate state of the forward pass from subgraph 1 may be loaded from memory and the forward pass of the machine learning model 50 may continue and the activation values of nodes in Hidden Layer N may be computed. Processing may continue during the forward pass until the output layer of the machine learning model 50 is reached. This output 80 may be input into the computer-implemented process 20 at machine learning output ingestion 275.

For example, subgraph 1 may implement all or part of a text embedding model that may generate semantically rich text embeddings for input natural language requests. In the example, all the input features used by the text embedding model may be available following NLU processing by NLU component 260. Accordingly, forward pass inference processing by subgraph 1 may commence when Features A and B are available. However, at a later time, when Feature C is available, this feature may be incorporated into the machine learning model 50 to refine the text embedding based on Feature C (and/or to perform some other task, such as determining a short list of candidate skills for processing the natural language request based on the rich text embedding). The intermediate result from subgraph 1 (e.g., the text embedding in the current example) may be stored until Feature C is used to commence subgraph 2 processing. Then the intermediate result from subgraph 1 may be combined with the result from subgraph 2 (e.g., to compute activation values for Hidden Layer N). Although there are two subgraphs shown in this example, it should be appreciated that any number of subgraphs may be used (and indeed hierarchical layers of subgraphs), in accordance with the desired implementation.

Notably, by partitioning the DAG of the machine learning model 50 into subgraphs 1 and 2, inference may begin earlier relative to a fully-connected network where it would be necessary to wait for all of Features A, B, and C to commence inference processing. This may reduce latency in the critical path (e.g., computer-implemented process 20).

Figure 2:
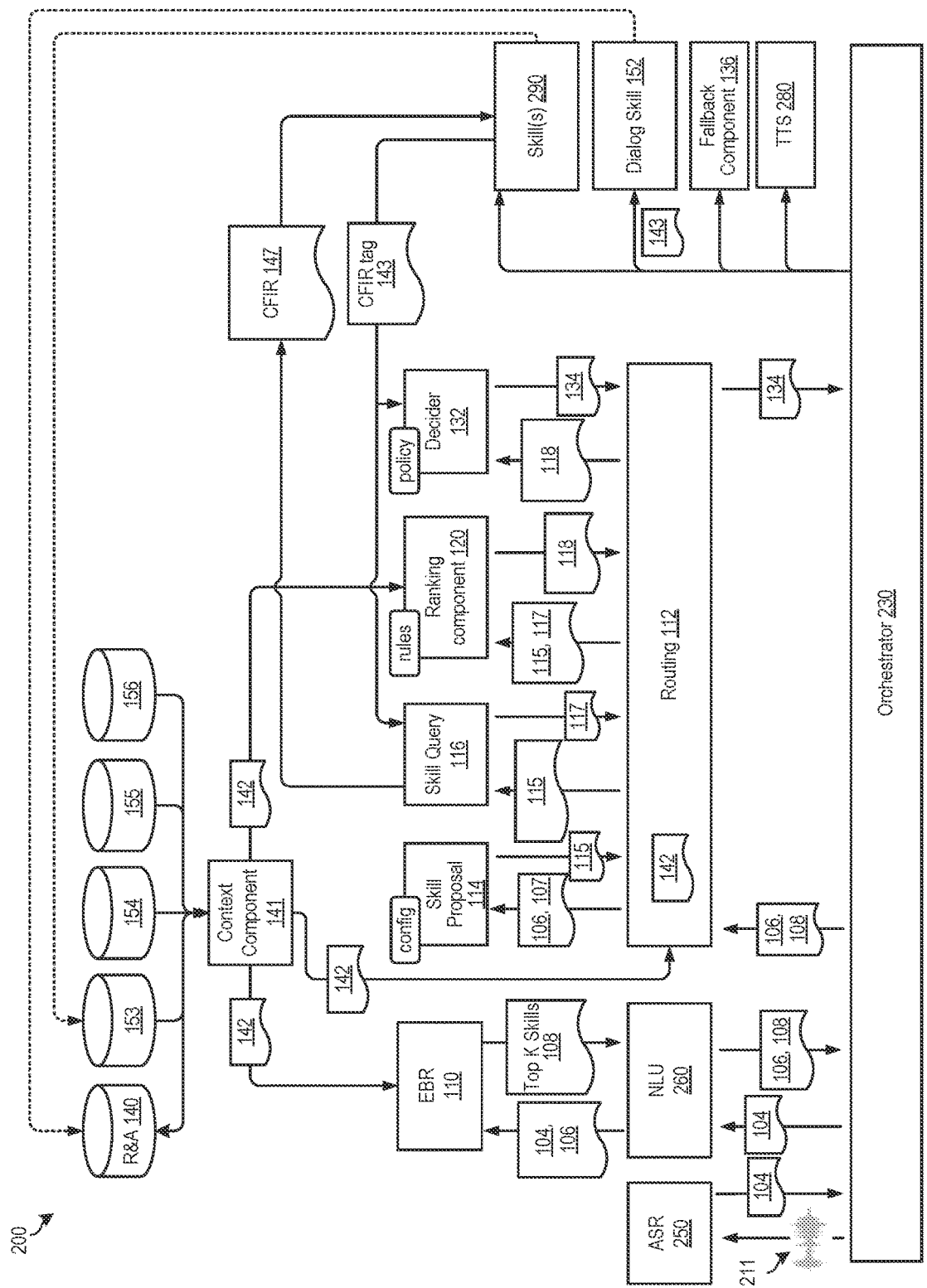
FIG. 2 is a block diagram illustrating an example natural language processing routing architecture, according to various embodiments of the present disclosure.

FIG. 2 is a block diagram illustrating an example natural language processing system 200, according to various embodiments of the present disclosure. FIG. 2 is used to illustrate the relative complexity of computer implemented processes that may generate various data that can be used to compute input features to machine learning models. Since there may be a large number of different operations/processes in a computer system (such as the natural language processing system 200 of FIG. 2) features may resolve over the course of time. As described herein, machine learning models that ingest such features may be constructed such that subgraphs of features that arrive at similar times may be used to incrementally and/or asynchronously perform inference, enabling richer functionality and/or reducing latency in the critical path of the underlying process. Various data is described below in reference to FIG. 2 as being generated by and sent between different components of the natural language processing system 200. These data may be examples of the types of data that can be used to compute different features that are then used as input to machine learning models. However, the various systems and techniques described herein from incremental, asynchronous inference may be used with any type of underlying computer process, data, features, and/or systems.

In various examples below, skills may be referred to, however the techniques described herein with respect to skills are applicable to any natural language processing applications. A system according to the present disclosure may operate using various components as described in FIG. 2. The various components illustrated FIG. 2 may be located on the same or different physical devices. Communication between various components illustrated in FIG. 2 may occur directly or across a network. A speech processing-enabled device may capture audio using an audio capture component, such as one or more microphone(s). The speech processing enabled device may send audio data 211 (e.g., corresponding to request data) to an orchestrator 230 of the natural language processing system 200. The speech processing enabled device may also send metadata (e.g., including device identifiers, device type data, contextual data, IP address data, room location data, etc.) to the orchestrator 230. The components depicted in FIG. 2, including components of a speech processing system may be generally referred to as spoken language processing components, a natural language processing system 200 a spoken language processing system, speech processing components, and/or a speech processing routing system. Additionally, in various examples, the components depicted in FIG. 2 may process written input (e.g., text data) in addition to spoken input.

Upon receipt by the natural language processing system 200, the audio data 211 may be sent to an orchestrator 230. The orchestrator 230 may include memory and logic that enables the orchestrator 230 to initiate a dialog session and to transmit various pieces and forms of data to various components of the system, as described in further detail below.

The orchestrator 230 may send the audio data 211 to an ASR component 250 (e.g., a speech recognition component). The ASR component 250 may transcribe the audio data 211 into one or more hypotheses representing speech contained in the audio data 211. The ASR component 250 interprets the speech in the audio data based on a similarity between the characteristics of the audio data corresponding to the speech and pre-established language models. For example, the ASR component 250 may compare the audio data 211 with models for sounds (e.g., subword units such as phonemes) and sequences of sounds to identify words that match the sequence of sounds in the speech represented in the audio data 211. The ASR component 250 may send text data and/or other ASR output data 104 generated thereby to orchestrator 230 that may, in turn, send the text data (and/or other ASR output data 104) to NLU component 260. As previously described, the text data and/or other ASR output data 104 may include one or more ASR hypotheses. The text data and/or other ASR output data 104 may include a top scoring hypothesis of the speech represented in the audio data 211 or may include an N-best list including a group of hypotheses of the speech represented in the audio data 211, and potentially respective scores ASR processing confidence scores. As previously described, in some other examples, the ASR component 250 (and/or other components of the natural language processing system 200) may generate other metadata associated with the request such as an overall utterance confidence score, per-word (e.g., per token) confidence scores for the utterance, utterance duration, stream duration (e.g., duration of the stream of audio data from speech processing enabled device to natural language processing system 200), a number of tokens output by ASR, etc.

The NLU component 260 attempts to make a semantic interpretation of the phrases or statements represented in the text data (and/or other ASR output data) input therein. That is, the NLU component 260 determines one or more meanings associated with the phrases or statements represented in the text data and/or other ASR output data 104 based on individual words represented in the text data (and/or other ASR output data 104). The NLU component 260 interprets a text string to derive an intent of the user (e.g., an action that the user desires be performed) as well as pertinent pieces of information in the text data (and/or other ASR output data) that allow a device (e.g., the speech processing enabled device, the natural language processing system 200, a computing device(s) implementing a speech processing application, etc.) to complete the intent. For example, if the text data and/or other ASR output data 104 corresponds to "Set temperature to 74 degrees," the NLU component 260 may determine the user intended to invoke a climate intent with a target temperature value slot of 74 degrees Fahrenheit. As previously described, in addition to the NLU intent and slot data, the NLU component 260 may generate other metadata associated with the request (e.g., with the audio data 211). Examples of such metadata include, an NLU confidence score for the top intent hypothesis, NLU classification type (e.g., statistical vs. deterministic), NLU slot presence (e.g., data indicating that a particular slot was present), NLU confidence score for the overall top hypothesis (e.g., including the relevant speech processing application, intent, and/or slot), entity recognition confidence scores, entity recognition match types (e.g., exact match, prefix match, suffix match, etc.), etc. Herein, the data output by the NLU component 260 (depicted in FIG. 2 as "NLU 260") is referred to as NLU output data 106.

NLU component 260 may send the text data (and/or other ASR output data 104) and/or some of NLU output data 106 (such as intents, recognized entity names, slot values, etc.) to an embedding-based retrieval component 110. The embedding-based retrieval component 110 may determine a similarity between the embedding data representing the natural language input and embedding data stored in various indices that are associated with different skills.

The embedding-based retrieval component 110 may request contextual data 142 from the context component 141 and the context component 141 may send contextual data 142 to embedding-based retrieval component 110. In various examples described herein, the contextual data 142 may include a list of preferred skills associated with the request, user account data, device identifier data, and/or data indicating that a particular agent that has been invoked (e.g., with a speech processing agent that is associated with the request). In various examples, the embedding-based retrieval component 110 may ingest this contextual data 142 as input (e.g., input features) and may generate the list of candidate skills for processing the current input request data based at least in part on the contextual data 142.

The embedding-based retrieval component 110 may generate similarity scores for each of the candidate skills indicating a similarity between the natural language input and an utterance that is stored in one or more indices in association with the particular skill. The similarity scores may be sent to the ranking component 120 and used as input to machine learned models of the ranking component 120 in order to rank candidate data (e.g., <interpretation, skill, skill session, agent>hypotheses) for processing the input request data.

Embedding-based retrieval component 110 may send the top K skills 108 to NLU component 260. NLU component 260 may thereafter perform skill-specific NLU processing for the skills in the top K skills 108 to determine skill-specific intents, slots, and/or named entities. NLU output data 106 may include such skill-specific data (e.g., skill-specific N-best hypotheses). In addition, NLU component 260 may determine interpretations of the input request data (e.g., the ASR output data 104 that are for other skills apart from the top K skills 108 output by the embedding-based retrieval component 110. In some examples, generating pre-computed features based on user feedback data by ranking and arbitration component 140 may generate increasingly contextually rich feature data that may be used to train various machine learning models used to route speech processing request data (e.g., ranking component 120, embedding-based retrieval component 110, etc.).

Ranking and arbitration component 140 may communicate with various systems in order to obtain source data used to precompute features. In an example embodiment, ranking and arbitration component 140 may receive source data used to precompute features that is generated by other speech processing components (e.g., NLU component 260, ASR component 250, etc.). For example, NLU output data may be used to pre-compute features for some downstream speech processing component (e.g., ranking component 120). Ranking component 120 may be "downstream" in the sense that processing by NLU component 260 occurs prior to processing by ranking component 120 during a given dialog session. In another example, ranking and arbitration component 140 may communicate with feedback storage 153 to receive user feedback data (e.g., explicit and/or implicit user feedback related to user satisfaction with processing of one or more request data) used as source data to precompute features. In various examples, the user feedback data may be user-specific and/or device specific and may indicate whether a user was satisfied or not satisfied with a particular interaction with natural language processing system 200. Additionally, ranking and arbitration component 140 may communicate with endpoint context system 154, which may provide context data at the conclusion of a user interaction with the natural language processing system 200. In another example, ranking and arbitration component 140 may communicate with speech processing application data 156 to determine information from the speech processing application regarding past interactions with the speech processing application and/or data acquired by the speech processing application. Additionally, ranking and arbitration component 140 may communicate with other data sources 155, as new services are added and/or as new data types that may be useful for routing prediction are made available. In addition to ranking and arbitration component 140 using contextual data 142 to precompute features used by various machine learning models of the routing architecture of the natural language processing system 200, a context component 141 may receive the contextual data 142. The context component 141 may provide the context data directly to both ranking and arbitration component 140 as well as to various components of the routing architecture of natural language processing system 200. For example, the context component 141 may send contextual data 142 to embedding-based retrieval component 110 and/or ranking component 120 in order to determine a shortlist of skills 290 for particular request data and/or in order to rank the shortlisted speech processing applications.

In some examples, one or more of the machine learning models described in reference to FIG. 2 (e.g., a model of Ranking and arbitration component 140) may be implemented using the various incremental, asynchronous inference architectures described herein. In this way, certain subgraphs of the model(s) may be evaluated for early-arriving features, while other subgraphs of the model may ingest later-arriving features. Spreading the inference out over time in this way can enable more complex models that generate denser intermediate hidden layer representations without contributing to critical path latency.

NLU output data 106 (e.g., intent data comprising semantic interpretations of the input request data) and top K skills 108 may be sent by NLU component 260 to orchestrator 230. Orchestrator 230 may send the top K skills 108 and the NLU output data 106 to routing component 112. Routing component 112 may query context component 141 using one or more of the device ID, entity ID, and/or deviceType ID received as part of the input request data. In response, the context component 141 may send contextual data 142 to routing component 112. In addition, embedding-based retrieval component 110 may receive slot data (included in NLU output data 106) as well as device state data and may select one or more skill sessions 107 on which to act for the input request. The selected skill session 107 may be sent from embedding-based retrieval component 110 to routing component 112.

Routing component 112 may send the top K skills 108, the selected skill session 107, and NLU output data 106 to skill proposal component 114. Skills 290 may subscribe to particular intents using skill proposal component 114. Accordingly, skill proposal component 114 may receive the NLU output data 106 and may determine whether any of the included intents correspond to one or more of skills 290 that have registered for the particular intent. If so, skill proposal component 114 may generate candidate data 115 comprising <interpretation, skill, skill session, agent>candidate quads. The candidate data 115 may be sent to routing component 112.

The hypothesis data comprising the candidate data 115 may be sent by routing component 112 to skill query service 116. Skill query service 116 comprises an API through which skills 290 may "opt out" of particular requests. For example, a skill 290 may comprise a video playback skill. Accordingly, the skill 290 may register with skill query service 116 to indicate that only requests made on a device with a display screen should be routed to the particular skill 290. In addition, skills 290 may communicate availability information, pricing information, and/or other structured descriptions of how and under what circumstances (e.g., determined using context data) the skill 290 can fulfill a request included in the current request data.

Skill query service 116 provides a capability for speech processing applications (e.g., skills) to provide signals to ranking component 120 that indicate how well the particular speech processing application may handle the current request data. For example, skill query service 116 may send a "Can fulfill intent request" (CFIR) 147 to candidate skills (e.g., top K skills 108 output by embedding-based retrieval component 110). CFIR 147 may include intent data and/or slot data (e.g., the interpretation of the input request) from the NLU output data 106. Each of the candidate skills may respond to the CFIR 147 with CFIR response data indicating whether the skills are able to process the current request data. Additionally, one or more of the candidate skills may respond to the CFIR 147 with CFIR tag 143, which may be metadata indicating an action and/or type of action that the particular candidate skill will perform if the request data is routed to the particular candidate skill for processing.

As previously described, the various candidate skills may evaluate an ability to fulfill a current request based on a determination as to whether the skill is effective to process the NLU output data (e.g., intent data) and/or recognize the slot data that is provided with the CFIR 147. Additionally, the skill may include a CFIR tag 143 with the response data that indicates a particular action that the skill would take if the skill is ultimately selected for processing the current request. For example, the CFIR tag 143 may be metadata indicating that the skill is able to process the intent successfully. In another example, the CFIR tag 143 may indicate that the skill intends to engage the user in a dialog in response to being selected to process the current request. In another example, the CFIR tag 143 may indicate that the skill intends to initiate streaming of video and/or audio (e.g., initiate video playback and/or audio playback) in response to being selected to process the current request. In another example, the CFIR tag 143 may indicate that the skill intends to render a spoken response (e.g., audio data output by a TTS component) to the user in response to being selected to process the current request.

In various examples, skill query service 116 may generate a signal 117 representing the CFIR tag 143 and/or the candidate skills' responses to eligible skill capability data (which may be provided as part of contextual data 142). If the skill action represented by the CFIR tag 143 does not correspond to the skill capability, the hypothesis including the relevant candidate data 115 may be filtered out (e.g., excluded from further routing decisions). Conversely, if the CFIR tag 143 represented by signal 117 indicates an action that corresponds to the skill capability data the relevant hypothesis candidate data 115 may be sent to ranking component 120.

The ranking component 120 may query context component 141 for contextual data 142 using one or more of the device ID, entity ID, and/or deviceType ID received as part of the input request data. The contextual data 142 sent to the ranking component 120 may include device context data and/or request context data. The ranking component 120 may use such contextual data 142 during ranking of the hypothesis data represented by the candidate data 115. Skill query service 116 may send a signal 117 indicating what skills can fulfill a particular request (and/or what skills are unable to fulfill the request), and/or how well the skill is able to fulfill the request. The signal 117 may be sent to routing component 112. Routing component 112 may send the signal 117 along with the candidate data 115 to a ranking component 120. In various examples, CFIR tag 143 may indicate situations in which a skill may opt out of processing a particular request (e.g., if the device sending the request data does not include a display screen, etc.). Accordingly, in at least some examples, CFIR 147 may include context data, such as a device ID, to indicate the context of the speech processing enabled device from which the request data was received.

Ranking component 120 may include one or more statistical machine learning models effective to rank the candidates included in candidate data 115. In order to rank the candidate data 115, ranking component 120 may generate confidence scores for each corresponding candidate data 115. As previously described, the ranking component 120 may receive the confidence scores generated by embedding-based retrieval component 110 and may use such scores as an input signal to rank the hypothesis data comprising the candidate data 115. A confidence score output by ranking component 120 may indicate that the corresponding skill 290 and/or intent of the candidate pair is appropriate to process the request. Ranking component 120 may compute features using the candidate data 115, the contextual data 142, and signal 117 (representing CFIR tag 143 and/or skill responses to CFIR 147) in order to predict the ranking of the skills 290 included in the candidate data 115. The features computing during processing of the request data (sometimes referred to as "runtime features") may comprise a feature representation of the list of candidate data 115 and/or a representation of the signal 117. Additionally, ranking component 120 may query ranking and arbitration component 140 for precomputed features that have been defined for use by ranking component 120. As previously described, the precomputed features may be determined based on contextual data, user feedback data, past usage data, skill data, previous rankings of ranking component 120, etc.

Ranking component 120 may generate a ranked list 118 of the candidate skills indicated in candidate data 115. In at least some examples, the ranking component 120 may use a deep neural network as a machine learning model for determining the ranked list 118. Inputs to the machine learning models of the ranking component 120 may include NLU output data 106, signal 117 (comprising CFIR tag 143), contextual data 142, candidate data 115, data representing enabled skills (e.g., for the speech processing enabled device and/or account that received the input request data/utterance), NLU confidence data, ASR confidence data, etc.

In various examples, a decider component 132 may receive the ranked list 118 of candidates (including any candidates selected via a dynamic routing adjustment, as described above). In some examples, the decider component 132 may act as a check on the results of the ranking component. For example, there may be scenarios in which statistical models of the ranking component 120 may determine that a request should be routed to a particular skill to perform a particular action. However, there may be risks associated with performance of the action or with routing the request data to the skill for processing. For example, a user may say the phrase "turn on the oven." The ranking component may determine that the top-ranked result is a control skill that is effective to process the request data to turn on the oven. However, contextual data 142 may indicate that the user is not currently at home. Accordingly, turning on the oven may currently be unsafe, and the statistical result of the ranking component 120 may not be a safe or an intended result according to a particular policy. The policy may be a set of deterministic rules used to provide safety boundaries on sensitive requests.

Accordingly, the decider component 132 may compare the results of the ranking component 120 to one or more predefined policies that may indicate whether or not request data should be sent to top-ranked result of the ranking component 120 or whether some other action should be taken. For example, if the phrase "Arm the security system" is interpreted by ASR/NLU as the current utterance, the decider component may comprise a policy indicating that the ranking component results should be ignored and that the utterance should always be passed to a security system skill used to control security system hardware.

In another example, a decider component may determine a class of the utterance. For example, if the utterance is classified as belonging to a sensitive class the speech processing system may use a dialogue speech processing application and/or TTS to confirm the user's intention prior to routing the request data to the top-ranked result of the ranker component. For example, request data may be a request to "unlock the front door." The top-ranked result of the ranking component may be routing to a skill that controls the lock on the front door. However, requests to unlock doors may be classified by the decider component 132 as a sensitive request. Accordingly, the receipt of the sensitive request may trigger a confirmation request output by TTS prior to routing the request data to the top-ranked skill. For example, the confirmation request may be "Did you want me to unlock the front door?" Decider component 132 may output plan data that comprises a routing plan 134 for processing the request data. The routing plan 134 may define a target skill 290 to process the request data as well as a target skill section (from candidate data 115) on which to act. As described above, the target skill 290 may be selected as the top-ranked hypothesis determined by the ranking component 120. In some other examples, the decider component 132 may select a target skill 290 based on a policy and/or based on a class of the request data, as described above. In many examples, the skill session to be acted upon may be the skill session output by embedding-based retrieval component 110. However, in some cases, a different skill session may be selected by the ranking component 120 based on the various other inputs. In some examples, the ranking component 120 may determine that two different skills and/or two different skill sessions are equally applicable for processing the request data. In such examples, the decider component 132 may determine that disambiguation should occur. Accordingly, the routing plan 134 may include sending the request data to a dialog skill 152 that may output (via TTS) one or more questions (e.g., a disambiguation request) used to prompt the user to disambiguate between the two equally likely (or approximately equally likely) interpretations of the request data. For example, it may be unclear, based on a user's request, whether the user intended to invoke a movie playback skill or a music playback skill, as a movie and a soundtrack for the movie may be identified using the same name. Accordingly, the decider component 132 may determine that the top two hypotheses of ranking component 120 are equally likely (or approximately equally likely) and may determine that a question should be asked to disambiguate between the two possible actions. Accordingly, the routing plan 134 may route the request data to the dialog skill 152, and the dialog skill 152 may inquire whether the user intended to play the movie or the soundtrack.

In another example, the decider component 132 may determine that the user was not satisfied with the top hypothesis of the ranking component 120 (e.g., due to explicit or implicit feedback received from the user in response to taking an action associated with the top ranking component 120 hypothesis). Accordingly, the decider component 132 may determine that the routing plan 134 should be to determine the second highest ranked hypothesis of the ranking component 120. The routing plan 134 may be sent to the fallback component 136. In various examples, the fallback component 136 may determine a list of the top hypotheses, top intents, and/or top ASR text interpretations from the previous turn of dialog, and may select a fallback option for processing the request data from the lists.

The natural language processing system 200 may also include a TTS component 280 that synthesizes speech (e.g., generates audio data) corresponding to text data input therein. Accordingly, one or more of skills 290, dialog skill 152, fallback component 136, ASR component 250, and/or orchestrator 230. The TTS component 280 may perform speech synthesis using one or more different methods. In one method of synthesis called unit selection, the TTS component 280 matches text data against one or more databases of recorded speech. Matching units are selected and concatenated together to form audio data. In another method of synthesis called parametric synthesis, the TTS component 280 varies parameters such as frequency, volume, and noise to create an artificial speech waveform output. Parametric synthesis uses a computerized voice generator, sometimes called a vocoder.

Figure 3A:
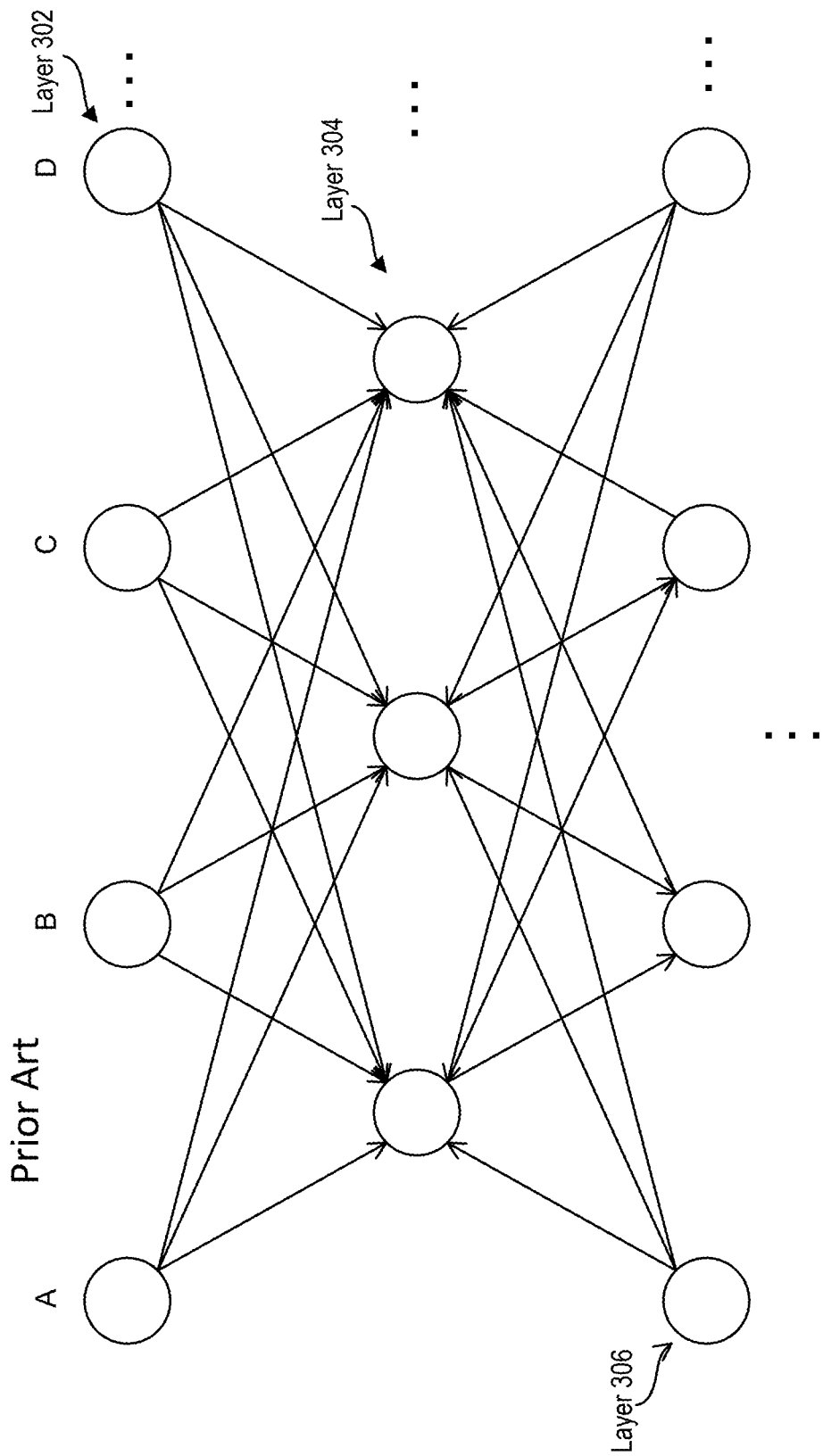
FIG. 3A depicts an example fully-connected machine learning model architecture, in accordance with various aspects of the present disclosure.

FIG. 3A depicts an example fully-connected machine learning model architecture, in accordance with various aspects of the present disclosure. The DAG shown in FIG. 3A is said to be "fully-connected" as each node in a layer is connected to each node in each adjacent layer. The quality of being "connected" indicates that activation values for a given node in a subsequent layer (e.g., layer 304) depend on the activation values of any nodes connected to that node in a preceding layer (e.g., layer 302). For example, the activation value of a given node in layer 304 is a weighted sum of the activation values of the nodes in layer 302 to which that node is connected. For example, each node in the input layer 302 is connected to each node in layer 304. The connections can be thought of as corresponding to the model weights, while the nodes may store activation values for a given input. Additionally, each node of layer 306 is connected to each node in the preceding layer 304.

In the example, the input layer 302 may take a vector having at least four dimensions. One dimension of the input vector may be a numeric value for Feature A, one dimension may be a numeric value for Feature B, one dimension may be a numeric value for Feature C, one dimension may be a numeric value for Feature D, and so on. In the input layer 302, the activation values of the nodes may correspond to the respective feature values (which may or may not be input into an activation function and/or have a bias term added).

In subsequent layers (e.g., layer 304), the activation value of each node may be determined by inputting the node value z into a given activation function (e.g., sigmoid, ReLu, tanh, etc.), where z is given by the expression:

$$z = \Sigma_i w_i x_i + b$$

Where $x_i$ represents the activation value of the nodes in the preceding layer and $w_i$ represents the weight connected that node in the preceding layer to the node for which the activation value is being calculated. The bias term b may be used to bias the node toward activation/inactivation. In a fully-connected network, the activation of any node in a hidden layer (e.g., any layer of the model that is not the input layer or the output layer) depends upon the activation of all nodes in the preceding layers.

Figure 3B:
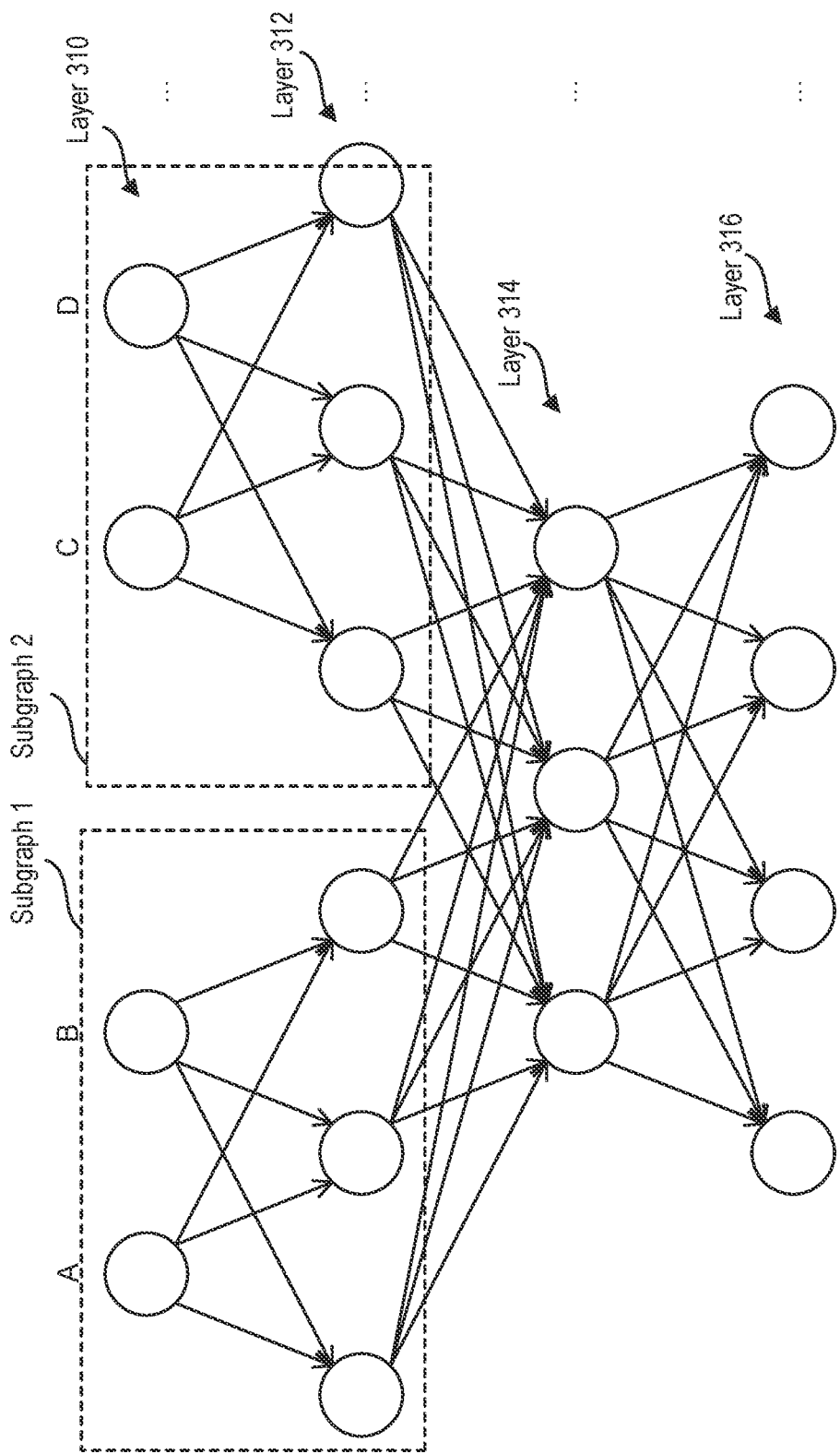
FIG. 3B depicts an example machine learning model architecture including at least two subgraphs configured to perform incremental asynchronous inference, in accordance with various aspects of the present disclosure.

FIG. 3B depicts an example machine learning model architecture including at least two subgraphs configured to perform incremental asynchronous inference, in accordance with various aspects of the present disclosure. In the DAG of the machine learning model architecture in FIG. 3B, subgraph 1 takes Features A and B as input at input layer 310, additionally, the activation of the nodes in layer 312 of subgraph 1 depend only on Features A and B and do not depend on any further features. This is the defining characteristic of a subgraph as used herein. In other words, a subgraph is a portion of the DAG of a machine learning model that depends on only a subset of input features. Similarly, subgraph 2 depends only on input Features C and D.

Layers 314 and 316 are part of the machine learning model illustrated in FIG. 3B but are not a part of either subgraph 1 or subgraph 2. This is because the nodes in layers 314 and 316 depend on input features from both subgraph 1 and subgraph 2.

In an example, the machine learning model depicted in FIG. 3B may be arranged such that a subgraph (e.g., subgraph 1) groups together input features that resolve at temporally similar times with respect to the underlying compute process (e.g., the natural language processing examples described in reference to FIGS. 1-2). For example, subgraph 1 may take features that resolve relatively early in the underlying compute process (e.g., within 50 milliseconds, 100 milliseconds, or some other suitable amount of time depending on the particularities of the underlying compute process), while subgraph 2 may take features that resolve later (e.g., between 200-500 milliseconds).

Relative to a fully-connected network, such as the DAG depicted in FIG. 3A, such an architecture enables subgraph 1 of the machine learning model in FIG. 3B to begin processing earlier, rather than waiting for all model features to resolve. Instead, subgraph 1 can begin processing once Features A and B are available. Although in the relatively simple example shown in FIG. 3B, subgraph 1 comprises only two layers, in a real world implementation, the subgraph may be considerably larger and more complicated. Accordingly, allowing the processing by subgraph 1 to be commenced earlier may result in overall latency reduction.

As previously described, layer 314 depends on features from subgraphs 1 and 2. Accordingly, when subgraph 1 processing reaches layer 312, a determination may be made that the subsequent layer (layer 314) depends on features from subgraph 2. Since subgraph 1 may have commenced processing earlier (and/or may have more or fewer layers relative to subgraph 2), the activation values for layer 312 of subgraph 2 may not yet be available. Accordingly, the intermediate result data (e.g., a three dimensional vector representing the activation values of the three nodes in layer 312 of subgraph 1) may be stored in memory until all the information used to calculate the activation values for layer 314 are available. When the three dimensional vector representing the activation values of the three nodes in layer 312 of subgraph 2 are available (or when features C and D are available, to further reduce latency), the intermediate values for subgraph 1 may be loaded from memory and used to calculate the activation values for layers 314 and 316.

Figure 4:
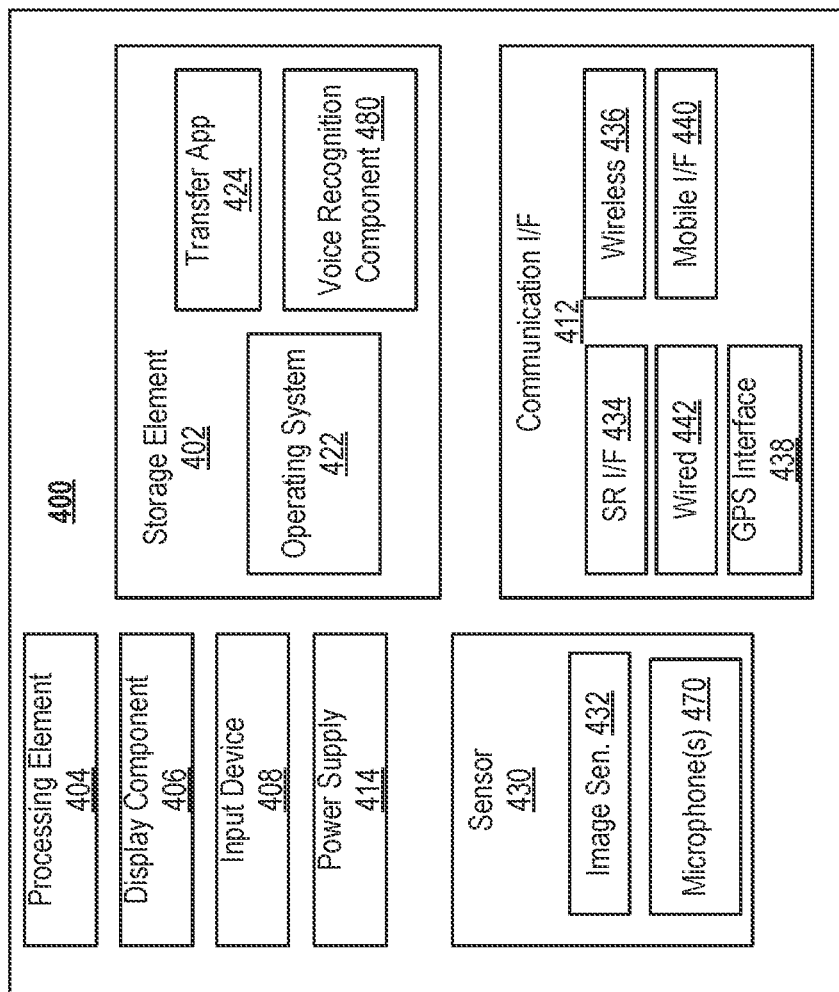
FIG. 4 is a block diagram showing an example architecture of a network-connected device that may be used in accordance with various embodiments described herein.

FIG. 4 is a block diagram showing an example architecture 400 of a network-connected device (e.g., a local network-connected device) that may be used to implement, at least in part, a natural language processing-enable device configured to receive spoken and/or other natural input commands, in accordance with various aspects of the present disclosure. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). In some examples, the processing element 404 may be effective to determine a wakeword and/or to stream audio data to a speech processing system. The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc. In various examples, the storage element 402 may comprise data representing the DAGs for machine learning models effective to implement asynchronous, incremental inference, as described herein.

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400. In some examples, the transfer application 424 may also be configured to send the received voice requests to one or more voice recognition servers.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 406 may be effective to display content determined provided by a skill executed by the processing element 404 and/or by another computing device.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. Voice recognition component 480 may interpret audio signals of sound captured by microphone 470. In some examples, voice recognition component 480 may listen for a "wakeword" to be received by microphone 470. Upon receipt of the wakeword, voice recognition component 480 may stream audio to a voice recognition server for analysis, such as a speech processing system. In various examples, voice recognition component 480 may stream audio to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as a computer communication network, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. An example of an image sensor 432 may be a camera configured to capture color information, image geometry information, and/or ambient light information.

Figure 5:
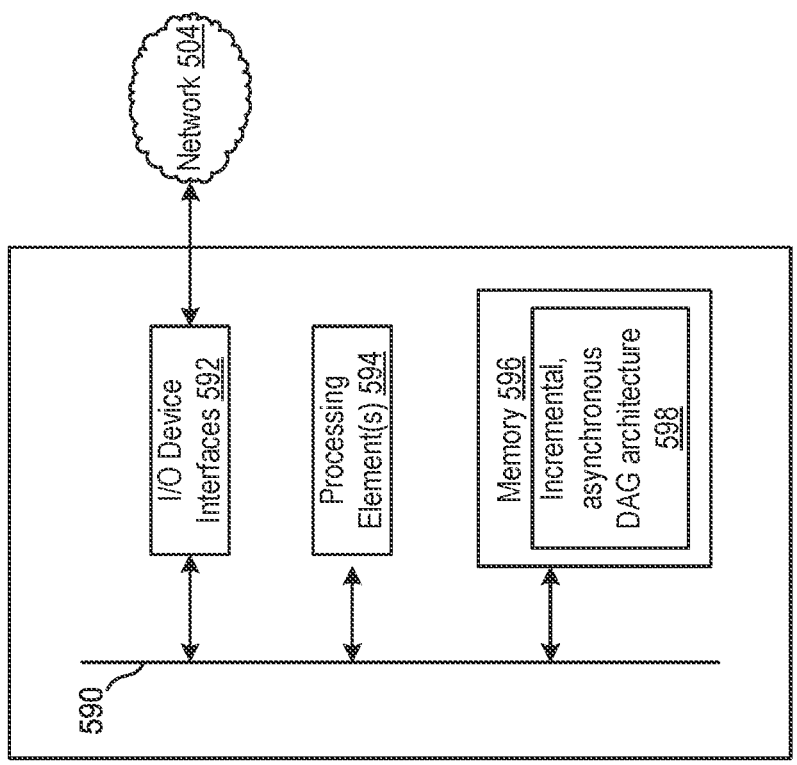
FIG. 5 is a block diagram showing an example architecture of a computing device that may be used in accordance with various embodiments described herein.

FIG. 5 is a block diagram conceptually illustrating example components of a remote device, such as a computing device executing a particular skill, a computing device executing one or more components of a speech processing system (e.g., ASR processing components, NLU processing components, applicable protocol recognition, etc.) and/or command processing. Multiple computing devices may be included in the system, such as one speech processing computing device for performing ASR processing, one speech processing computing device for performing NLU processing, one or more skill computing device(s) implementing skills, etc. In operation, each of these devices (or groups of devices) may include non-transitory computer-readable and computer-executable instructions that reside on the respective device, as will be discussed further below. The remote device of FIG. 5 may communicate with one or more other devices over a network 504 (e.g., a wide area network or local area network).

Each computing device of a speech processing system may include one or more controllers/processors 594, which may each include at least one central processing unit (CPU) for processing data and computer-readable instructions, and a memory 596 for storing data and instructions of the respective device. In at least some examples, memory 596 may store, for example, a list of N-best intents data that may be generated for particular request data. In some examples, memory 596 may store machine learning models of the NLU component 260, such as machine learned models associated with various NLU process flows (described in reference to FIG. 1A), when loaded from memory 596. In various further examples, memory 596 may be effective to store instructions effective to program controllers/processors 594 to perform the various techniques described above in reference to FIGS. 1-3B. Accordingly, in FIG. 5, the incremental, asynchronous DAG architecture 598 is depicted as being stored within memory 596, as an example. It should be noted that the DAG architecture 598 and/or the data representing the intermediate states of the forward pass may be stored in various different memories. In various examples, the characteristics of the underlying compute process may be used to determine which memory type is used to store the data representing the intermediate states of the forward pass. For example, if the intermediate state vector is to be persisted for a relatively long period of time (due to a late-resolving feature in the underlying compute process), the intermediate state vector may be stored in RAM or persistent storage. Conversely, if the data representing the intermediate states of the forward pass needs only wait for feature data that will be resolved relatively quickly by the underlying compute process, the intermediate data may be stored on chip (e.g., in memory on the GPU). There may be a tiered setup where intermediate result data may be stored in slower memory depending on the estimated length of time for which the intermediate data is likely to be persisted (based on the characteristics of the underlying compute process). The memories 596 may individually include volatile random access memory (RAM), non-volatile read only memory (ROM), non-volatile magnetoresistive memory (MRAM), and/or other types of memory. Each computing device of a speech processing system (and/or a component thereof) may also include memory 596 for storing data and controller/processor-executable instructions. Each memory 596 may individually include one or more non-volatile storage types such as magnetic storage, optical storage, solid-state storage, etc. Each computing device of a speech processing system may also be connected to removable or external non-volatile memory and/or storage (such as a removable memory card, memory key drive, networked storage, etc.) through respective input/output device interfaces 592. In various examples, the feature data and/or training data used by the various machine learning models may be stored and/or cached in memory 596.

Computer instructions for operating each computing device of natural language processing system 220 may be executed by the respective device's controllers/processors 594, using the memory 596 as temporary "working" storage at runtime. A device's computer instructions may be stored in a non-transitory manner in non-volatile memory 596 (e.g., a non-transitory computer-readable memory), memory 596, or an external device(s). Alternatively, some or all of the executable instructions may be embedded in hardware or firmware on the respective device in addition to or instead of software.

Each computing device of natural language processing system 200 includes input/output device interfaces 592. A variety of components may be connected through the input/output device interfaces 592, as will be discussed further below. Additionally, each computing device of a speech processing system may include an address/data bus 590 for conveying data among components of the respective device. Each component within a computing device of a speech processing system may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of a speech processing system, as described herein, are exemplary, and may be located as a stand-alone device or may be included, in whole or in part, as a component of a larger device or system.

Figure 6:
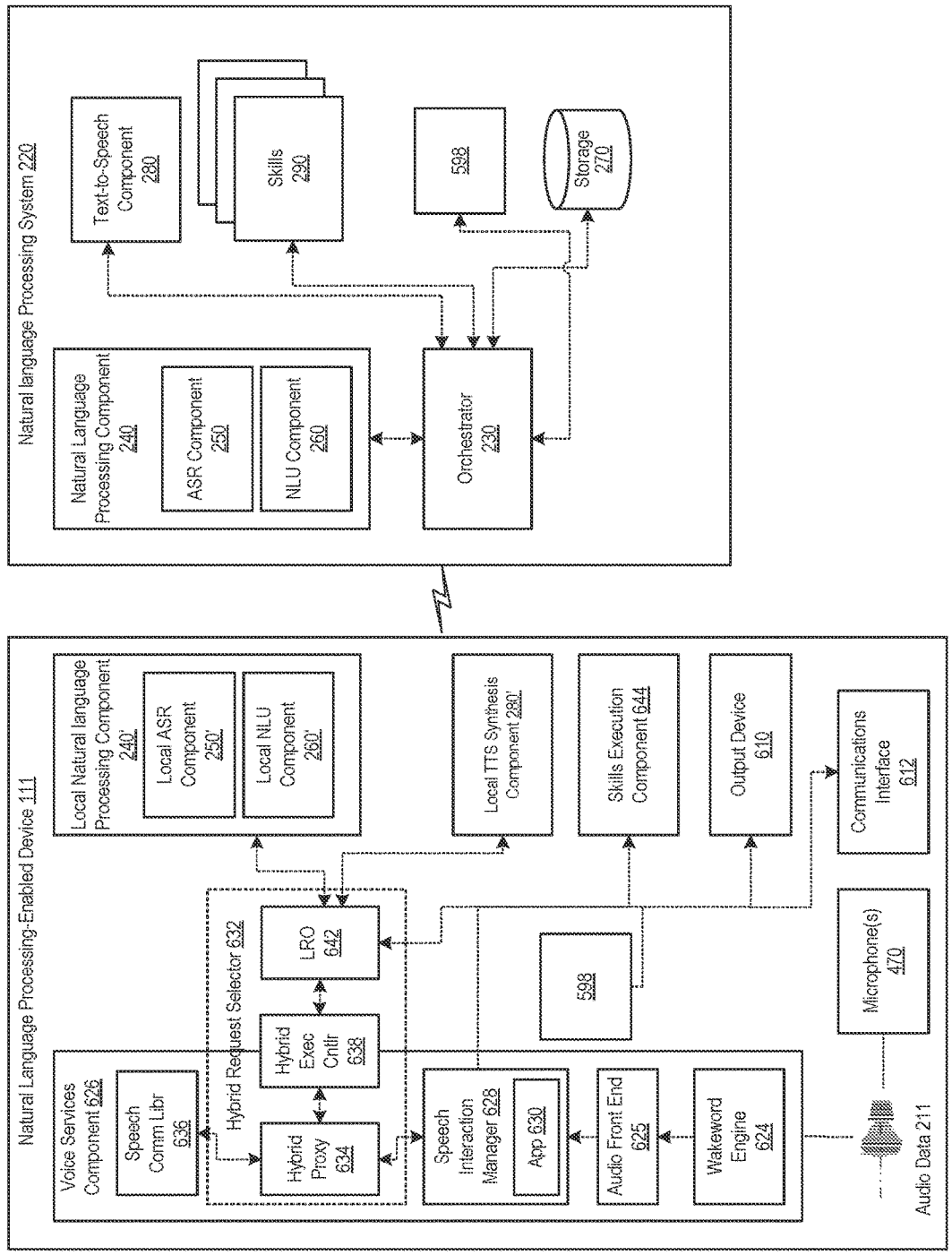
FIG. 6 is a block diagram illustrating a natural language processing-enabled device and a natural language processing management system, in accordance with embodiments of the present disclosure.

FIG. 6 is a block diagram illustrating a device 111 (e.g., a natural language processing enabled device) and a natural language processing system 220, in accordance with embodiments of the present disclosure. In various examples, device 111 may be a natural language processing-enabled device and may include microphones (e.g., far-field microphone arrays) used to transform audio into electrical signals. The device 111 may be among the network-connected devices described herein that are local to (e.g., communicating on the same LAN) one or more other network-connected devices. Natural language processing may then be performed, either locally by the natural language processing components of device 111, by one or more other computing devices communicating with the device 111 over a network (e.g., natural language processing system 220), or by some combination of the device 111 and the one or more other computing devices. In various examples, device 111 may include and/or may be configured in communication with output device(s) 610 (e.g., speakers, displays, and/or other network connected devices) effective to output information obtained in response to a user's spoken request or command, or to output content that may be of interest to one or more users. As used herein, a display of the device 111 refers to a display effective to output graphics such as images and/or video. Further, as used herein, a displayless device refers to a device that does not include a display that is effective to render graphical images or text.

In various examples, the device 111 may store one or more incremental, asynchronous DAG architectures 598 including subgraphs effective to process different input features as they become available. In some cases, such model architectures and/or learned parameters may be deployed on the device 111 to further reduce latency. Accordingly, the device 111 may be used to determine a list of candidate skills that are most likely to be able to service the current natural language input.

A natural language processing-enabled computing system may respond to user utterances by outputting content and/or performing one or more other actions, such as playing music, providing information, calling a taxi, displaying an image, etc. Generally, input data received by the various natural language processing systems and components described herein may comprise natural language input data. Natural language input data may be in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech-processing systems may be configured with multiple applications (e.g., thousands, tens of thousands, or more applications) that can be used to potentially respond to a user request. Applications may be referred to herein as "skills." Natural language processing systems may be effective to process spoken and/or textual natural language inputs to determine data representing a semantic understanding of the inputs. Skills may include any application effective to communicate with a natural language processing system in order to take one or more actions based on inputs from the natural language processing system. For example, a speech-processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. The number of applications/skills continues to grow and the rate of growth is increasing as developers become more accustomed to application programming interfaces (APIs) and application development kits provided for the voice user interface system. Rule-based approaches and/or predefined utterance matching may be used in some systems for processing requests spoken in a certain format to invoke a particular application. In at least some examples, a "skill," "skill component," "skill," "natural language processing skill," and the like may be software running on a computing device, similar to a traditional software application running on a computing device. Such skills may include a voice user interface in addition to or instead of, in at least some instances, a graphical user interface, smart home device interface, and/or other type of interface.

In addition to using the microphone(s) 470 to capture utterances and convert them into digital audio data 211, the device 111 may additionally, or alternatively, receive audio data 211 (e.g., via the communications interface 612) from another device in the environment. In various examples, the device 111 may capture video and/or other image data using a camera. Under normal conditions, the device 111 may operate in conjunction with and/or under the control of a remote, network-based or network-accessible natural language processing system 220. The natural language processing system 220 may, in some instances, be part of a network-accessible computing platform that is maintained and accessible via a wide area network (WAN). Network-accessible computing platforms such as this may be referred to using terms such as "on-demand computing", "software as a service (SaaS)", "platform computing", "network-accessible platform", "cloud services", "data centers", and so forth. The natural language processing system 220 may be configured to provide particular functionality to large numbers of local (e.g., in-home, in-car, etc.) devices of different users. The WAN is representative of any type of public or private, wide area network, such as the Internet, which extends beyond the environment of the device 111. Thus, the WAN may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

In some embodiments, the natural language processing system 220 may be configured to receive audio data 211 from the device 111, to recognize speech in the received audio data 211, and to perform functions in response to the recognized speech. In some embodiments, these functions involve sending a command, from the natural language processing system 220, to the device 111 to cause the device 111 to perform an action, such as output an audible response to the user speech via output device 610 (e.g., one or more loudspeakers). Thus, under normal conditions, when the device 111 is able to communicate with the natural language processing system 220 over a WAN (e.g., the Internet), some or all of the functions capable of being performed by the natural language processing system 220 may be performed by sending a command over a WAN to the device 111, which, in turn, may process the command for performing actions. For example, the natural language processing system 220, via a remote command that is included in remote response data, may instruct the device 111 to output an audible response (e.g., using a local text-to-speech (TTS) synthesis component 280) to a user's question, to output content (e.g., music) via output device 610 (e.g., one or more loudspeakers) of the device 111, or to control other devices in the local environment (e.g., the user's home). It is to be appreciated that the natural language processing system 220 may be configured to provide other functions, in addition to those discussed herein, such as, without limitation, providing step-by-step directions for navigating from an origin to a destination location, conducting an electronic commerce transaction on behalf of a user as part of a shopping function, establishing a communication session between the current user and another user, etc.

In order to process voice commands locally, the device 111 may include a local voice services component 626. When a user utterance including the wakeword is captured by the microphone 470 of the device 111, the audio data 211 representing the utterance is received by a wakeword engine 624 of the voice services component 626. The wakeword engine 624 may be configured to compare the audio data 211 to stored models used to detect a wakeword (e.g., "Computer") that indicates to the device 111 that the audio data 211 is to be processed for determining an intent. Thus, the wakeword engine 624 is configured to determine whether a wakeword is detected in the audio data 211, and, if a wakeword is detected, the wakeword engine 624 can proceed with routing the audio data 211 to an audio front end (AFE) 625 (sometimes referred to as an acoustic front end (AFE)) of the voice services component 626. If a wakeword is not detected in the audio data 211, the wakeword engine 624 can refrain from sending the audio data 211 to the AFE 625, thereby preventing the audio data 211 from being further processed. The audio data 211 can be discarded.

The AFE 625 is configured to transform the audio data 211 received from the wakeword engine 624 into data for processing by a suitable ASR component and/or NLU component. The AFE 625 may reduce noise in the audio data 211 and divide the digitized audio data 211 into frames representing a time intervals for which the AFE 625 determines a number of values, called features, representing the qualities of the audio data 211, along with a set of those values, called a feature vector, representing the features/qualities of the audio data 211 within the frame. Many different features may be determined, and each feature represents some quality of the audio data 211 that may be useful for ASR processing and/or NLU processing. A number of approaches may be used by the AFE 625 to process the audio data 211, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some embodiments, the AFE 625 is configured to use beamforming data to process the received audio data 211. Beamforming can be used to distinguish between the directions from which speech and noise originate. Accordingly, the microphones 470 may be arranged in a beamforming array to receive multiple audio signals, where multiple audio sources including speech may be identified in different beams and processed. Beamforming may involve processing multiple audio signals (e.g., originating from multiple microphones in a microphone array) together, such as by time shifting one audio signal with respect to another audio signal, to increase the signal and decrease the noise in the audio. Time offsets in the audio data 211, used by the AFE 625 in beamforming, may be determined based on results of the wakeword engine 624's processing of the audio data 211. For example, the wakeword engine 624 may detect the wakeword in the audio data 211 from a first microphone 470 at time, t, while detecting the wakeword in the audio data 211 from a second microphone 470 a millisecond later in time (e.g., time, t+1 millisecond), and so on and so forth, for any suitable number of audio signals corresponding to multiple microphones 470 in a microphone array.

A speech interaction manager (SIM) 628 of the voice services component 626 may receive the audio data 211 that has been processed by the AFE 625. The SIM 628 may manage received audio data 211 by processing request data and non-speech noise or sounds as events, and the SIM 628 may also manage the processing of commands that are used to respond to the user speech or non-speech noise or sounds (e.g., by controlling the action(s) of natural language processing components of device 111). The SIM 628 may include one or more client applications 630 for performing various functions at the device 111.

A hybrid request selector component 632 of the device 111 is shown as including a hybrid proxy component (HP) 634, among other components. The HP 634 can be implemented as a layer within the voice services component 626 that is located between the SIM 628 and a speech communication library (SCL) 636, and may be configured to proxy traffic to/from the natural language processing system 220. For example, the HP 634 may be configured to pass messages between the SIM 628 and the SCL 636 (such as by passing events and instructions there between), and to send messages to/from a hybrid execution controller component (HEC) 638 of the hybrid request selector component 632. For instance, command data received from the natural language processing system 220 can be sent to the HEC 638 using the HP 634, which sits in the path between the SCL 636 and the SIM 628. The HP 634 may also be configured to allow audio data 211 received from the SIM 628 to pass through to the natural language processing system 220 (via the SCL 636) while also receiving (e.g., intercepting) this audio data 211 and sending the received audio data 211 to the HEC 638 (sometimes via an additional SCL).

As will be described in more detail below, the HP 634 and the HEC 638 are configured to perform a handshake procedure to connect to each other. As part of this handshake procedure, the HP 634 and the HEC 638 exchange data including, without limitation, configurations, context, settings, device identifiers (ID), networking protocol versions, time zones, and language data (sometimes referred to herein as "locale data"). Based on at least some of this data (e.g., based at least in part on the language data) exchanged during the handshake procedure, the HEC 638 determines whether to accept or reject the connection request from the HP 634. If the HEC 638 rejects the HP's 634 connection request, the HEC 638 can provide metadata to the HP 634 that provides a reason why the connection request was rejected.

A local natural language processing component 240' (sometimes referred to as a "natural language processing component," a "spoken language understanding (SLU) component," a "speech engine," or an "engine") is configured to process audio data 211 (e.g., audio data 211 representing user speech, audio data 211 representing non-speech noise or sounds, etc.). In some embodiments, the hybrid request selector component 632 may further include a local request orchestrator component (LRO) 642. The LRO 642 is configured to notify the local natural language processing component 240' about the availability of new audio data 211 that represents user speech, and to otherwise initiate the operations of the local natural language processing component 240' when new audio data 211 becomes available. In general, the hybrid request selector component 632 may control the execution of the local natural language processing component 240', such as by sending "execute" and "terminate" events/instructions to the local natural language processing component 240'. An "execute" event may instruct the local natural language processing component 240' to continue any suspended execution based on audio data 211 (e.g., by instructing the local natural language processing component 240' to execute on a previously-determined intent in order to generate a command). Meanwhile, a "terminate" event may instruct the local natural language processing component 240' to terminate further execution based on the audio data 211, such as when the device 111 receives command data from the natural language processing system 220 and chooses to use that remotely-generated command data.

The LRO 642 may interact with a skills execution component 644 that is configured to receive intent data output from the local natural language processing component 240' and to execute a skill based on the intent.

To illustrate how the device 111 can operate at runtime, consider an example where a user utters an expression, such as "Computer, turn off the kitchen lights." The audio data 211 is received by the wakeword engine 624, which detects the wakeword "Computer," and forwards the audio data 211 to the SIM 628 via the AFE 625 as a result of detecting the wakeword. The SIM 628 may send the audio data 211 to the HP 634, and the HP 634 may allow the audio data 211 to pass through to the natural language processing system 220 (e.g., via the SCL 636), and the HP 634 may also input the audio data 211 to the local natural language processing component 240' by routing the audio data 211 through the HEC 638 of the hybrid request selector 632, whereby the LRO 642 notifies the local natural language processing component 240' of the incoming audio data 211. At this point, the hybrid request selector 632 may wait for response data from the natural language processing system 220 and/or the local natural language processing component 240'.

The local natural language processing component 240' is configured to receive the audio data 211 from the hybrid request selector 632 as input, to recognize speech (and/or non-speech audio events) in the audio data 211, to determine an intent (e.g., user intent) from the recognized speech (or non-speech audio event). This intent can be provided to the skills execution component 644 via the LRO 642, and the skills execution component 644 can determine how to act on the intent by generating directive data. In some cases, a directive may include a description of the intent (e.g., an intent to turn off {device A}). In some cases, a directive may include (e.g., encode) an identifier of a second device, such as the kitchen lights, and an operation to be performed at the second device. Directive data that is generated by the skills execution component 644 (and/or the natural language processing system 220) may be formatted using Java, such as JavaScript syntax, or JavaScript-based syntax. This may include formatting the directive using JSON. In some embodiments, a locally-generated directive may be serialized, much like how remotely-generated directives are serialized for transmission in data packets over the network. In other embodiments, a locally-generated directive is formatted as a programmatic API call with a same logical operation as a remotely-generated directive. In other words, a locally-generated directive may mimic remotely-generated directives by using a same, or a similar, format as the remotely-generated directive.

The local natural language processing component 240' may include an automatic speech recognition (ASR) component 250' that is configured to perform ASR processing on the audio data 211 to convert the audio data 211 into text data (sometimes referred to herein as "ASR text data," an "ASR result", or "ASR data"). ASR transcribes audio data 211 into text data representing the words of the user speech contained in the audio data 211. A spoken utterance in the audio data 211 can be input to the local ASR component 250', which then interprets the utterance based on the similarity between the utterance and pre-established language models available to the local natural language processing component 240'. In some embodiments, the local ASR component 250' outputs the most likely text recognized in the audio data 211, or multiple hypotheses in the form of a lattice or an N-best list with individual hypotheses corresponding to confidence scores or other scores (such as probability scores, etc.). In some embodiments, the local ASR component 250' is customized to the user (or multiple users) who created a user account to which the device 111 is registered. For instance, the language models (and other data) used by the local ASR component 250' may be based on known information (e.g., preferences) of the user, and/or on a history of previous interactions with the user.

The local natural language processing component 240' may also include a local NLU component 260' that performs NLU processing on the generated ASR text data to determine intent data and/or slot data (referred to herein as a "NLU result", or "NLU data") so that directives may be determined (e.g., by the skills execution component 644) based on the intent data and/or the slot data. Generally, the local NLU component 260' takes textual input (such as text data generated by the local ASR component 250') and attempts to make a semantic interpretation of the ASR text data.

Natural Language Processing System

In other situations, the device 111 may send the audio data 211 to the natural language processing system 220 for processing. As described above, the device 111 may capture audio using the microphone 470, and send audio data 211 (e.g., representing a spoken user request), corresponding to the captured audio, to the natural language processing system 220. The device 111 may include a wakeword detection component that detects when input audio includes a spoken wakeword, and when the wakeword is detected, the audio data 211 is sent by the device 111 to the natural language processing system 220.

Upon receipt by the natural language processing system 220, the audio data 211 may be sent to an orchestrator 230. The orchestrator 230 may include memory and logic that enables the orchestrator 230 to send various pieces and forms of data to various components of the system.

Similar to the operation described above with respect to the local natural language processing component 240' of the device 111, the orchestrator 230 may send the audio data 211 to a natural language processing component 240. An ASR component 250 of the natural language processing component 240 transcribes the audio data 211 into one or more hypotheses representing speech contained in the audio data 211. The natural language processing component 240 interprets the speech in the audio data based on a similarity between the characteristics of the audio data corresponding to the speech and pre-established language models. For example, the natural language processing component 240 may compare the audio data 211 with models for sounds (e.g., subword units such as phonemes) and sequences of sounds to identify words that match the sequence of sounds in the speech represented in the audio data 211. The natural language processing component 240 may send text data generated thereby to an NLU component 260 of the natural language processing component 240. The text data output by the natural language processing component 240 may include a top scoring hypothesis of the speech represented in the audio data 211 or may include an N-best list including a group of hypotheses of the speech represented in the audio data 211, and potentially respective scores ASR processing confidence scores.

The NLU component 260 attempts to make a semantic interpretation of the phrases or statements represented in the text data input therein. That is, the NLU component 260 determines one or more meanings associated with the phrases or statements represented in the text data based on individual words represented in the text data. The NLU component 260 interprets a text string to derive an intent of the user (e.g., an action that the user desires be performed) as well as pertinent pieces of information in the text data that allow a device (e.g., the natural language processing system 220) to complete the intent. For example, if the text data corresponds to "Play the new album by {Musical_Artist}", the NLU component 260 may determine the user intended to invoke a music playback intent to play the identified album.

The natural language processing system 220 may include a non-transitory computer-readable memory storage 270, storing various instructions for operation of the natural language processing system 220. As previously described, in some examples, the natural language processing system 220 may store one or more incremental, asynchronous DAG architectures 598 including subgraphs effective to process different input features as they become available. As previously described, such incremental, asynchronous architectures may be effective to spread out the inference processing over time and may reduce latency in the critical path of the underlying compute process.

As described above, the natural language processing system 220 may include one or more skills 290. The natural language processing system 220 may also include a TTS component 280 that synthesizes speech (e.g., generates audio data) corresponding to text data input therein. The TTS component 280 may perform speech synthesis using one or more different methods. In one method of synthesis called unit selection, the TTS component 280 matches text data against one or more databases of recorded speech. Matching units are selected and concatenated together to form audio data. In another method of synthesis called parametric synthesis, the TTS component 280 varies parameters such as frequency, volume, and noise to create an artificial speech waveform output. Parametric synthesis uses a computerized voice generator, sometimes called a vocoder.

The various components of the natural language processing system 220 and the device 111 described herein may be implemented in software, hardware, firmware, or some combination thereof.

The natural language processing system 220 may reside on device 111, in a cloud computing environment, or some combination thereof. For example, the device 111 may include computing equipment, some portion of which is configured with some or all of the components or functionality of natural language processing system 220 and another portion of which is configured with some or all of the components or functionality of computing device(s) used in natural language processing system 220. The device 111 may then perform a variety of functions on its own (such as when remote communications are unavailable), and/or may communicate (when capable) with computing device(s) and/or the natural language processing system 220 to perform other functions. Alternatively, all of the functionality may reside on the device 111 or remotely.

Figure 7:
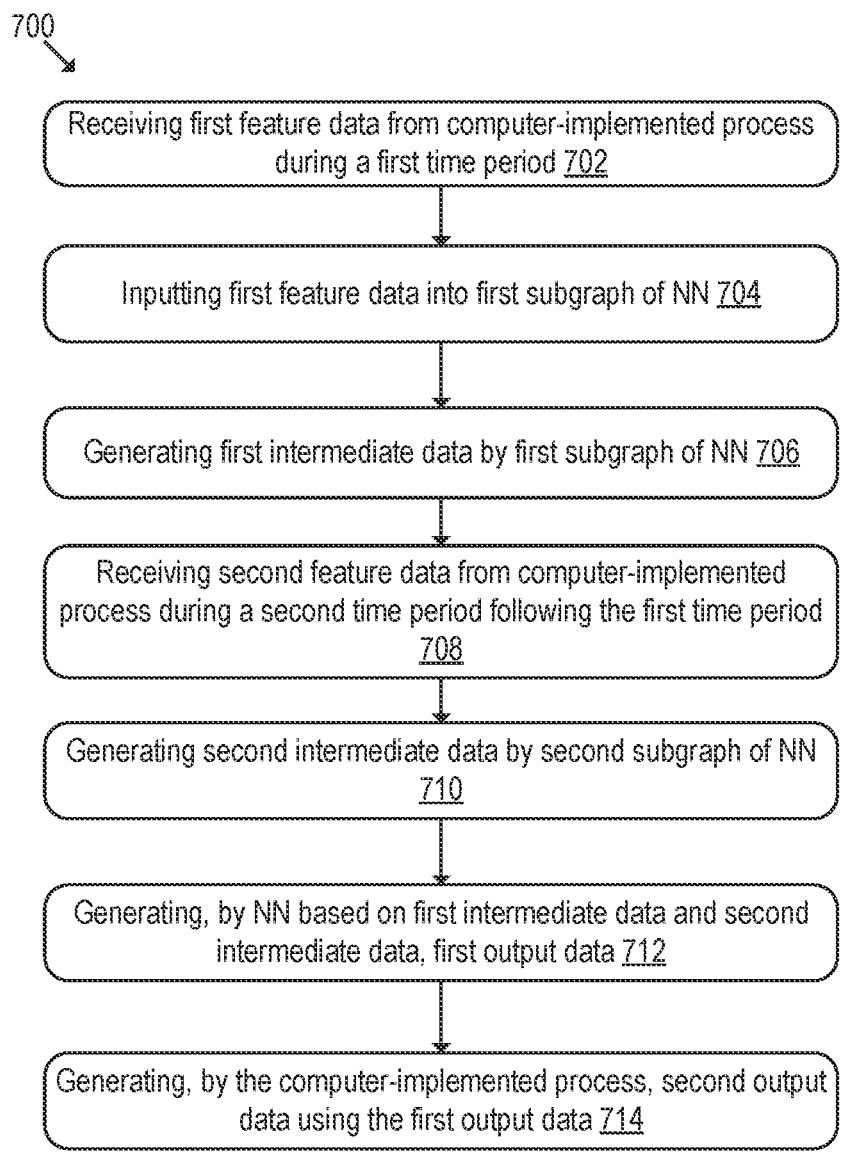
FIG. 7 is a flow diagram illustrating an example process for incremental asynchronous inference, in accordance with various aspects of the present disclosure.

FIG. 7 is a flow diagram illustrating an example process 700 for incremental asynchronous inference, in accordance with various aspects of the present disclosure. The process 700 of FIG. 7 may be executed by one or more computing devices. The actions of process 700 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 700 may be described above with reference to elements of FIGS. 1-6. Although shown in a particular order, the steps of process 700 may instead be performed in a different order. Additionally, various steps may be performed in parallel in various implementations. Further, some steps may be omitted and/or other steps may be added in accordance with the network anomaly detection techniques described herein.

Process 700 may begin at action 702, at which first feature data may be received from a computer-implemented process during a first time period. For example, first feature data may be computed from some data generated by an underlying compute process. For example, the first feature data may be a numeric representation of an early-arriving feature in the underlying compute process (e.g., device context data).

Processing may continue at action 704 at which the first feature may be input into the first subgraph of a neural network. Upon inputting first feature data (and any other feature data used by the particular subgraph) into the first subgraph, the first subgraph may commence inference processing in a forward pass even if some other subgraphs of the neural network have not yet received all pertinent feature data.

Processing may continue at action 706 at which first intermediate data may be generated by the first subgraph of the neural network. For example, the forward pass of the first subgraph may proceed to calculate per-node activation values as described herein until a subsequent layer depends upon activation values from some other subgraph that is not yet available. At this point, the first intermediate data may be stored in memory until such time as all the node activation values that are used to compute the activation for the subsequent layer are available.

Processing may continue at action 708 at which second feature data may be received from the computer-implemented process during a second time period following the first time period. For example, some later-arriving feature data (relative to the first feature data) may be generated by the computer-implemented process. In some examples, the second feature data may include the features for a second subgraph of the neural network.

Processing may continue at action 710 at which second intermediate data by a second subgraph of the neural network may be generated. For example, the forward pass of the second subgraph may proceed to calculate per-node activation values as described herein until a subsequent layer depends upon activation values from some other subgraph that is not yet available. At this point, the second intermediate data may be stored in memory until such time as all the node activation values that are used to compute the activation for the subsequent layer are available. If the second intermediate data is the last set of values needed to compute the activation for the subsequent layer, all the other previously-generated intermediate data may be loaded from memory and may be used, in combination with the second intermediate data to compute the activation values for the next layer and the forward pass of the neural network may continue. In some examples, any stored intermediate data may be loaded once the input features are received for all subgraphs so that by the time the intermediate values from other subgraphs are generated, the stored intermediate value is loaded into memory and ready for use.

Processing may continue at action 712, at which the neural network may generate, based on the first intermediate data and the second intermediate data, first output data. For example, after all features have been received, any stored intermediate data may be loaded and the forward pass of the neural network may continue until an output is generated at the output layer of the neural network.

Processing may continue at action 714, at which the computer-implemented process may generate second output data using the first output data. For example, once inference has been performed by the neural network (e.g., incremental, asynchronous inference, as described herein), the underlying computer process that generated the data that was used to compute some or all of the features used during inference by the neural network, the result of inference (e.g., the neural network's output) may be used by the computer-implemented process. For example, in the context of natural language processing, the neural network may compute an utterance embedding representing the input user speech. Accordingly, the utterance embedding may be provided to some system of the underlying compute process that uses the utterance embedding as input (e.g., another neural network configured to rank skills for processing the utterance based at least in part on the utterance embedding). It should be noted that this is merely an example, and that the output may be used in any desired context for any desired underlying compute service/process.

Figure 8:
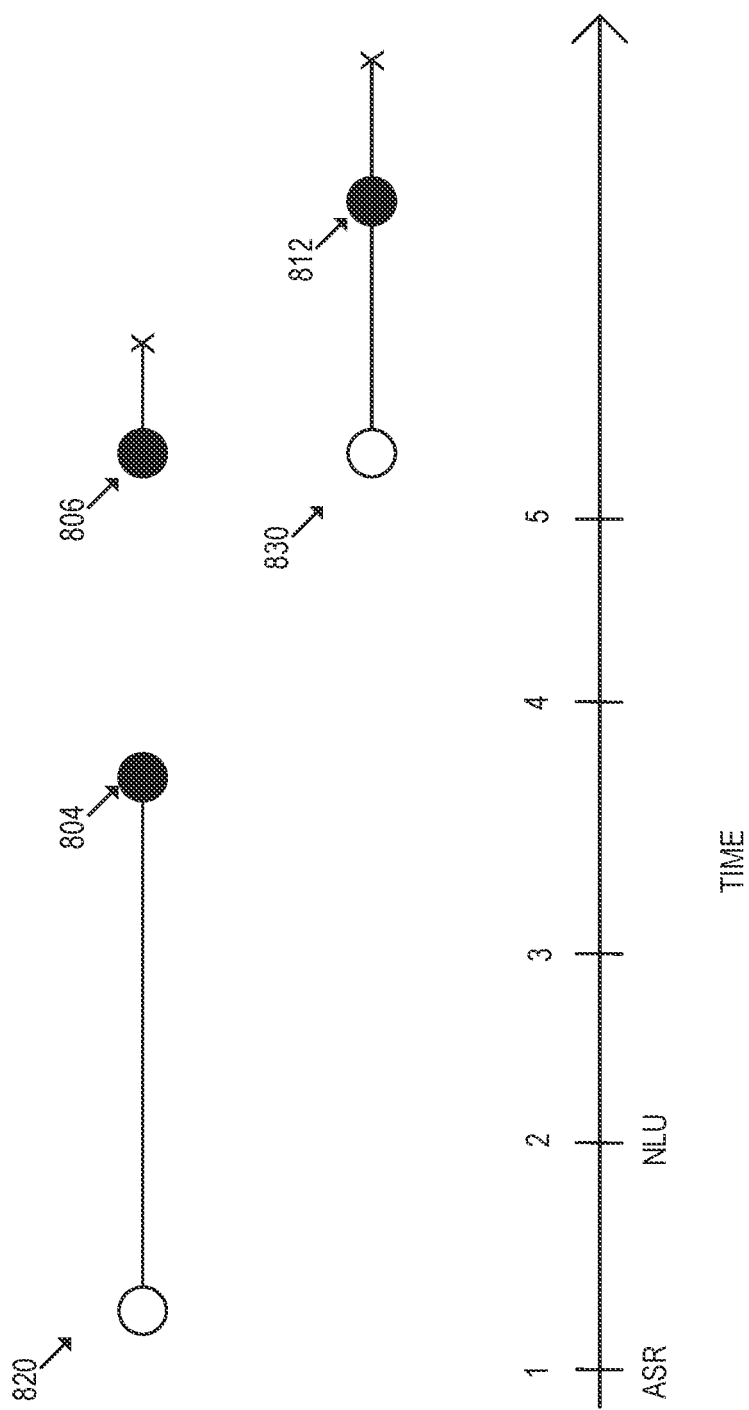
FIG. 8 is a timing diagram illustrating example latency and processing benefits that may be achieved using the various incremental asynchronous inference architectures described herein.

FIG. 8 is a timing diagram illustrating example latency and processing benefits that may be achieved using the various incremental asynchronous inference architectures described herein. The line at the bottom of FIG. 8 represents a computer service process where intermediate results are returned at times 1, 2, 3, 4, and 5 during the course of the compute service process (e.g., generating web-based content for a user navigating a web application, natural language processing, and/or any other compute process that generates a variety of data over time).

Process flow 830 represents machine learning inference processing using an architecture where all relevant features are computed before commencing inference processing. For example, process flow 830 may be for a fully-connected neural network wherein the network waits for all input features to resolve before beginning inference. Process flow 830 may commence after time 5 at which point all features may be available. Initial processing may result in an intermediate result 812 (e.g., a text embedding representing transcribed user speech). That intermediate result may be used to perform some prediction and processing may end at some point after time 6. In various examples, the model architecture that is used to generate the intermediate result 812 may be kept relatively simple in order to limit latency in the critical path of the underlying compute service (represented by the line at the bottom of FIG. 8). However, while such a simple architecture may keep overall latency in the critical path at an acceptable level, this may come at the expense of performance where relatively lightweight, faster model architectures may be used to generate acceptable results.

Conversely, process flow 820 represents asynchronous, incremental inference. In this example, subgraph inference may start as soon as the features used as input for the relevant subgraph(s) are available. Advantageously, since inference begins earlier relative to process flow 830, a more robust model architecture (e.g., a model with a larger number of parameters) may be used that has a slower inference time, but which generates higher quality results (e.g., as more complex, longer processing may be undertaken, in order to generate higher quality feature encodings). For example, while an utterance encoder in the process flow 830 may use a relatively shallow neural network, the utterance encoder in the process flow 820 may use a large language model encoder (e.g., a transformer-based encoder such as the bidirectional encoder representations for transformers (BERT) which may generate higher quality embeddings relative to the shallower neural network that may be used to improve performance for downstream tasks.

In the process flow 820, the intermediate result 804 (e.g., the text embedding) may be stored when the model reaches a layer that depends upon features that are not yet available, as previously described. When such features are available (e.g., action 806), the intermediate result may be loaded and used for further processing by the machine learning model. Additionally, in the example of FIG. 8, process flows 820 and 830 may use the same downstream model architecture that ingests the intermediate result 812 and/or the intermediate result loaded at action 806. Accordingly, the process time from the point at which the intermediate result is input is the same. However, since the intermediate result in process flow 820 was generated after time 1 (on the basis of features available at that time), while the intermediate result in process flow 830 was not generated until after time 5 (using all available features), process flow 820 is completed prior to process flow 830, reducing latency in the critical path.

Accordingly, in some examples, asynchronous, incremental inference processing may be spread out over a longer duration, but may reduce overall system latency. Further, since there is more time to perform the inference processing, denser, more robust model architectures may be used, thereby improving performance.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
receiving first natural language input data;
generating first automatic speech recognition (ASR) data representing a transcription of the first natural language input data;
generating first feature data using the first ASR data at a first time;
inputting at least the first feature data into a first subgraph of a neural network;
generating, by a first layer of the first subgraph of the neural network, a first hidden state vector;
storing the first hidden state vector in a data store;
generating, by a natural language understanding (NLU) component using the first ASR data, first NLU output data;
generating second feature data using the first NLU output data at a second time;
inputting at least the second feature data into a second subgraph of the neural network;
generating, by the second subgraph of the neural network, a second hidden state vector;
loading the first hidden state vector from the data store;
determining, by the neural network using the first hidden state vector and the second hidden state vector, first output data; and
determining a first action to take in response to the first natural language input data using the first output data and the first NLU output data.

2. The method of claim 1, further comprising:
determining that at least one value used to process the first hidden state vector to generate a third hidden state vector during a forward pass of the neural network is unavailable;
storing the first hidden state vector in the data store based at least in part on the at least one value being unavailable;
determining that the second hidden state vector comprises the at least one value;
loading the first hidden state vector from the data store based at least in part on the second hidden state vector comprising the at least one value; and
generating, by the neural network, the third hidden state vector using the first hidden state vector and the second hidden state vector.

3. The method of claim 1, further comprising:
generating, during a first time period by the first subgraph, the first hidden state vector using a first set of features available from processing the first natural language input data during the first time period; and
generating, during a second time period by the second subgraph, the second hidden state vector using a second set of features available from processing the first natural language input data during at least one of the first time period or the second time period.

4. A method comprising:
receiving first feature data;
inputting the first feature data into a first subgraph of a neural network having first features that are available during a first time period;
generating, by the first subgraph of the neural network, first intermediate data based at least in part on the first feature data;
receiving second feature data during a second time period separate from the first time period;
inputting the second feature data into a second subgraph of the neural network having second features that are available during the second time period;
generating, by the second subgraph of the neural network, second intermediate data based at least in part on the second feature data;
generating, by the neural network based at least in part on the first intermediate data and the second intermediate data, first output data; and
generating second output data based at least in part on the first output data.

5. The method of claim 4, further comprising:
determining, after the generating the first intermediate data, that the second intermediate data is not yet available; and
storing the first intermediate data in first non-transitory computer-readable memory.

6. The method of claim 5, further comprising:
loading the first intermediate data from the first non-transitory computer-readable memory based at least in part on the generating the second intermediate data.

7. The method of claim 6, further comprising:
determining an activation value for a first node of a first hidden layer of the neural network based at least in part on a first weighted combination of nodes of the first intermediate data and a second weighted combination of nodes of the second intermediate data.

8. The method of claim 4, further comprising:
loading the first subgraph of the neural network into non-transitory computer-readable memory, wherein the first subgraph comprises a first hidden layer that is fully-connected with respect to a first input layer; and
loading the second subgraph of the neural network into the non-transitory computer-readable memory, wherein the second subgraph comprises a second hidden layer that is fully-connected with respect to a second input layer, wherein first nodes of the first hidden layer are not directly connected to any nodes of the second input layer and second nodes of the second hidden layer are not directly connected to any nodes of the first input layer.

9. The method of claim 4, further comprising loading a third layer of the neural network into non-transitory computer-readable memory, wherein the third layer is connected to the first subgraph and the second subgraph.

10. The method of claim 4 further comprising:
generating the first feature data by an automatic speech recognition (ASR) component of the natural language processing during the first time period; and
generating the second feature data by a natural language understanding (NLU) component of the natural language processing during the second time period.

11. The method of claim 10, wherein the first output data comprises embedding data representing a semantic interpretation of a natural language input, the method further comprising:
inputting the embedding data into a ranking component of the computer-implemented process;
generating, by the ranking component based at least in part on the embedding data, a first ranked list of natural language processing applications for processing the natural language input; and
generating the second output data by the ranking component, wherein the second output data comprises a selection of a first natural language processing application for processing the natural language input.

12. The method of claim 4, further comprising:
determining a computer-implemented process;
determining that the first features of the first subgraph are generated from first data generated by the computer-implemented process during the first time period; and
determining that the second features of the second subgraph are generated from second data generated by the computer-implemented process during the first time period or the second time period.

13. A system comprising:
at least one processor; and
non-transitory computer-readable memory storing instructions that, when executed by the at least one processor, are effective to cause the at least one processor to:
receive first feature data;
input the first feature data into a first subgraph of a neural network having first features that are available during a first time period;
generate, by the first subgraph of the neural network, first intermediate data based at least in part on the first feature data;
receive second feature data generated based on a computer-implemented process executed during a second time period separate from the first time period;
input the second feature data into a second subgraph of the neural network having second features that are available during the second time period;
generate, by the second subgraph of the neural network, second intermediate data based at least in part on the second feature data;
generate, by the neural network based at least in part on the first intermediate data and the second intermediate data, first output data; and
generate second output data based at least in part on the first output data.

14. The system of claim 13, the non-transitory computer-readable memory storing further instructions that, when executed by the at least one processor, are further effective to cause the at least one processor to:
determine, after the generating the first intermediate data, that the second intermediate data is not yet available; and
store the first intermediate data in the non-transitory computer-readable memory.

15. The system of claim 14, the non-transitory computer-readable memory storing further instructions that, when executed by the at least one processor, are further effective to cause the at least one processor to load the first intermediate data from the non-transitory computer-readable memory based at least in part on the generating the second intermediate data.

16. The system of claim 15, the non-transitory computer-readable memory storing further instructions that, when executed by the at least one processor, are further effective to cause the at least one processor to determine an activation value for a first node of a first hidden layer of the neural network based at least in part on a first weighted combination of nodes of the first intermediate data and a second weighted combination of nodes of the second intermediate data.

17. The system of claim 13, the non-transitory computer-readable memory storing further instructions that, when executed by the at least one processor, are further effective to cause the at least one processor to:
load the first subgraph of the neural network into the non-transitory computer-readable memory, wherein the first subgraph comprises a first hidden layer that is fully-connected with respect to a first input layer of the neural network; and
load the second subgraph of the neural network into the non-transitory computer-readable memory, wherein the second subgraph comprises a second hidden layer that is fully-connected with respect to a second input layer of the neural network, wherein first nodes of the first hidden layer are not directly connected to any nodes of the second input layer and second nodes of the second hidden layer are not directly connected to any nodes of the first input layer.

18. The system of claim 13, the non-transitory computer-readable memory storing further instructions that, when executed by the at least one processor, are further effective to cause the at least one processor to load a third layer of the neural network into non-transitory computer-readable memory, wherein the third layer is connected to the first subgraph and the second subgraph.

19. The system of claim 13, wherein the non-transitory computer-readable memory storing further instructions that, when executed by the at least one processor, are further effective to cause the at least one processor to:
generate the first feature data by an automatic speech recognition (ASR) component of the natural language processing during the first time period; and
generate the second feature data by a natural language understanding (NLU) component of the natural language processing during the second time period.

20. The system of claim 19, wherein the first output data comprises embedding data representing a semantic interpretation of a natural language input, and wherein the non-transitory computer-readable memory storing further instructions that, when executed by the at least one processor, are further effective to cause the at least one processor to:
input the embedding data into a ranking component of the computer-implemented process;
generate, by the ranking component based at least in part on the embedding data, a first ranked list of natural language processing applications for processing the natural language input; and
generate the second output data by the ranking component, wherein the second output data comprises a selection of a first natural language processing application for processing the natural language input.

* * * * *